(12) United States Patent
Takaoki

(10) Patent No.: US 7,084,219 B2
(45) Date of Patent: Aug. 1, 2006

(54) CONTACT PRODUCT, AND CATALYST COMPONENT AND CATALYST FOR ADDITION POLYMERIZATION, AND PROCESS FOR PRODUCING ADDITION POLYMER

(75) Inventor: Kazuo Takaoki, Albany, CA (US)

(73) Assignee: Sumitomo Chemical Company, Limited, Osaka (JP)

( * ) Notice: Subject to any disclaimer, the term of this patent is extended or adjusted under 35 U.S.C. 154(b) by 229 days.

(21) Appl. No.: 10/759,283

(22) Filed: Jan. 20, 2004

(65) Prior Publication Data

US 2004/0209767 A1 Oct. 21, 2004

(30) Foreign Application Priority Data

Mar. 25, 2003 (JP) .............................. 2003-082376

(51) Int. Cl.
*C08F 4/44* (2006.01)
*B01J 37/00* (2006.01)
*B01J 37/04* (2006.01)
*B01J 31/00* (2006.01)

(52) U.S. Cl. ...................... 526/148; 526/160; 526/163; 526/146; 526/145; 526/147; 502/118; 502/123

(58) Field of Classification Search ................ 526/148, 526/160, 163, 146, 145, 147; 502/118, 123
See application file for complete search history.

(56) References Cited

U.S. PATENT DOCUMENTS 5,919,983 A 7/1999 Rosen et al.
6,121,185 A 9/2000 Rosen et al.
6,528,596 B1 * 3/2003 Takaoki et al. ............. 526/113
6,586,356 B1 * 7/2003 Takaoki et al. ............. 502/155
6,914,108 B1 * 7/2005 Takaoki et al. ............... 526/89

FOREIGN PATENT DOCUMENTS

| DE | 101 64 188 A1 * | 8/2002 |
|---|---|---|
| EP | 0 468 651 A1 | 1/1992 |
| EP | 0 514 828 A1 | 11/1992 |
| EP | 1 113 025 A2 | 7/2001 |
| EP | 1 113 026 A2 | 7/2001 |

* cited by examiner

*Primary Examiner*—David W. Wu
*Assistant Examiner*—Rip A. Lee
(74) *Attorney, Agent, or Firm*—Sughrue Mion, PLLC

(57) ABSTRACT

A contact product obtained by a process comprising the step of contacting a compound (a) represented by the formula, $M^1L^1_r$, a compound (b) represented by the formula, $R^1_{s-1}T^1H$, a compound (c) represented by the formula, $R^2_{t-2}T^2H_2$, and a nonionic surfactant (d) having no active hydrogen; a catalyst component for addition polymerization comprising said contact product; a catalyst for addition polymerization obtained by a process comprising the step of contacting said catalyst component with a compound of a metal selected from the group consisting of metals of the Groups 3 to 12 and Lanthanide Series of the Periodic Table, and optionally an organoaluminum compound; and a process for producing an addition polymer comprising the step of polymerizing an addition polymerizable monomer in the presence of said catalyst.

14 Claims, No Drawings

CONTACT PRODUCT, AND CATALYST COMPONENT AND CATALYST FOR ADDITION POLYMERIZATION, AND PROCESS FOR PRODUCING ADDITION POLYMER

FIELD OF THE INVENTION

The present invention relates to a contact product; a catalyst component for addition polymerization comprising the contact product; a catalyst for addition polymerization using the catalyst component for addition polymerization; and a process for producing an addition polymer.

BACKGROUND OF THE INVENTION

Since olefin polymers such as polypropylene and polyethylene are excellent in mechanical properties and chemical resistance, and excellent in balance between those properties and economical efficiency, they have been widely used in various fields such as a packaging field. These olefin polymers have conventionally been produced by polymerizing an olefin using a conventional type solid catalyst (multi-site catalyst), which combines a solid catalyst component obtained by using a metal compound of the Group IV such as titanium trichloride or titanium tetrachloride, with a metal compound of the Group 13 represented by an organoaluminum compound.

However, as a catalyst providing addition polymer shaving less stickiness and more excellent strength than those produced by the conventional catalyst, a so-called single site catalyst prepared by combining a catalyst component such as a metallocene complex or half metallocene complex with a co-catalyst component for activation such as an aluminoxane, and tri(n-butyl)ammonium tetrakis(pentafluorophenyl) borate, was proposed and with respect to the single site catalyst, improvements for using it in an industrial scale have been studied (e.g. U.S. Pat. Nos. 4,542,199, 5,621,126 and 5,153,157).

Further, recently, a compound prepared by contacting diethylzinc, pentafluorophenol and water has been developed as a co-catalyst component for activation, and a catalyst prepared by contacting said co-catalyst component with the metallocene complex has been proposed as a high activity catalyst (e.g. U.S. Pat. No. 6,586,356).

However, according to the inventor's studies, when an olefin is addition-polymerized with the above-mentioned catalyst, its polymerization activity is not completely satisfactory.

SUMMARY OF THE INVENTION

Under the above-situations, an object of the present invention is to provide a contact product used as a catalyst component of a catalyst for addition polymerization having an excellent polymerization activity; a catalyst component for addition polymerization comprising the contact product; a catalyst for addition polymerization using the catalyst component for addition polymerization; and a process for producing an addition polymer using the catalyst for addition polymerization.

Namely, the present invention is a contact product obtained by a process comprising the step of contacting the following components (a) to (d):

(a) a compound represented by the following formula [1]

   [1], (b) a compound represented by the following formula [2]

   [2], (c) a compound represented by the following formula [3],

   [3], and (d) a nonionic surfactant having no active hydrogen, wherein $M^1$ is a metal atom of the Groups 3 to 12, the Group 14, the Group 15 or Lanthanide Series of the Periodic Table of the Elements; r is a valence of $M^1$; $L^1$ is a hydrogen atom, a halogen atom, a hydrocarbon group or a hydrocarbonoxy group, and when two or more $L^1$'s exist, they may be the same or different from one another; each of $T^1$ and $T^2$ is a non-metal atom of the Group 15 or 16 in the Periodic Table independently of each other; s is a valence of $T^1$; t is a valence of $T^2$; $R^1$ is an electron-withdrawing group or an electron-withdrawing group-containing group, and when two or more $R^1$'s exist, they may be the same or different from one another; and $R^2$ is a hydrocarbon group, and when two or more $R^2$'s exist, they may be the same or different from one another.

Also, the present invention is a catalyst component for addition polymerization comprising said contact product.

Further, the present invention is a catalyst for addition polymerization obtained by a process comprising the step of contacting said catalyst component for addition polymerization with a compound of a metal selected from the group consisting of metals of the Groups 3 to 12 and Lanthanide Series of the Periodic Table, and optionally an organoaluminum compound.

Still further, the present invention is a process for producing an addition polymer comprising the step of polymerizing an addition polymerizable monomer in the presence of said catalyst for addition polymerization.

DETAILED DESCRIPTION OF THE INVENTION

Examples of $M^1$ in the formula [1] are a scandium atom, an yttrium atom, a titanium atom, a zirconium atom, a hafnium atom, a vanadium atom, a chromium atom, a molybdenum atom, a manganese atom, a rhenium atom, an iron atom, a ruthenium atom, a cobalt atom, a rhodium atom, a nickel atom, a palladium atom, a platinum atom, a copper atom, a silver atom, a gold atom, a zinc atom, a cadmium atom, a mercury atom, a germanium atom, a tin atom, a lead atom, an antimony atom, a bismuth atom, a samarium atom and an ytterbium atom. $M^1$ is preferably a metal atom of the Groups 5 to 12, the Group 14 or the Group 15; more preferably a metal atom of the Groups 8 to 12, the Group 14 or the Group 15; further preferably a metal atom of the Group 12, the Group 14 or the Group 15; particularly preferably a metal atom of the Group 12; and most preferably a zinc atom.

In the formula [1], r is a valence of $M^1$, and for example, when $M^1$ is a zinc atom, r is 2.

Examples of the halogen atom of $L^1$ are a fluorine atom, a chlorine atom, a bromine atom and an iodine atom. The hydrocarbon group of $L^1$ is preferably an alkyl group, an aryl group or an aralkyl group. The hydrocarbon oxy group of L1 is preferably an alkoxy group or an aryloxy group.

Examples of the above-mentioned alkyl group are a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group and a n-eicosyl group.

These alkyl groups may be substituted with a halogen atom such as a fluorine atom, a chlorine atom, a bromine atom and an iodine atom. Examples of the alkyl group substituted with the halogen atom are a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchloirobutyl group, a perchloropentyl group, perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group and a perbromoeicosyl group.

Further, these alkyl groups may be substituted with n alkoxy group such as a methoxy group and an ethoxy group: an aryloxy group such as a phenoxy group; or an aralkyloxy group such as a benzyloxy group.

The alkyl group as $L^1$ is preferably an alkyl group having 1 to 20 carbon atoms, and more preferably a methyl group, an ethyl group, an isopropyl group, a n-butyl group, a tert-butyl group or an isobutyl group.

Examples of the aryl group as $L^1$ are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group.

These aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; and an aralkyloxy group such as a benzyloxy group.

The aryl group is preferably an aryl group having 6 to 20 carbon atoms, and more preferably a phenyl group or a 2-, 3-, or 4-tolyl group.

Examples of the aralkyl group as $L^1$ are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (tetradecylphenyl)methyl group, a naphthylmethyl group and an anthracenylmethyl group.

These aralkyl groups may be substituted with a halogen atom such as a fluorine atom, a chlorine atom, a bromine atom and an iodin atom; an alkoxy group such as a methoxy group and an ethoxy group; an aryloxy group such as a phenoxy group; or an aralkyloxy group such as a benzyloxy group.

The aralkyl group as $L^1$ is preferably an aralkyl group having 7 to 20 carbon atoms, and more preferably a benzyl group.

Examples of the alkoxy group as $L^1$ are a methoxy group, an ethoxy group, a n-propoxy group, an isopropoxy group, a n-butoxy group, a sec-butoxy group, a tert-butoxy group, an isobutoxy group, a n-pentyloxy group, a neopentyloxy group, a tert-pentyloxy group, a n-hexyloxy group, a n-heptyloxy group, a n-octyloxy group, a n-decyloxy group, a n-dodecyloxy group, a n-pentadecyloxy group and a n-eicosyl oxy group.

These alkoxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The alkoxy group as $L^1$ is preferably an alkoxy group having 1 to 20 carbon atoms, and more preferably a methoxy group, an ethoxy group, an isopropoxy group, a tert-butoxy group, an isobutoxy group, a neopentyl group or a tert-pentyloxy group.

Specific examples of the aryloxy group as $L^1$ area phenoxy group, a 2-tolyloxy group, a 3-tolyloxy group, a 4-tolyloxy group, a 2,3-xylyloxy group, a 2,4-xylylphenoxy group, a 2,5-xylyloxy group, a 2,6-xylyloxy group, a 3,4-xylyloxy group, a 3,5-xylyloxy group, a 2,3,4-trimethylphenoxy group, a 2,3,5-trimethylphenoxy group, a 2,3,6-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, an isobutylphenoxy group, a n-pentylphenoxy group, a neopentylphenoxy group, a n-hexylphenoxy group, a n-octylphenoxy group, a n-decylphenoxy group, a n-tetradecylphenoxy group, a naphthoxy group and an anthrathenoxy group.

These aryloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The aryloxy group is preferably an aryloxy group having 6 to 20 carbon atoms, and more preferably a phenoxy group.

As L¹ in the above formula [1], preferred is a hydorogen atom, an alkyl group or an aryl group, more preferred is a hydrogen atom or an alkyl group, and particularly preferable is an alkyl group.

Examples of the component (a), wherein M¹ is a zinc atom, and a dialkylzinc such as dimethylzinc, diethylzinc, dipropylzinc, di-n-butylzinc, diisobutylzinc, di-n-hexylzinc, diallylzinc and bis(cyclopentadienyl)zinc; a diarylzinc such as diphenylzinc, dinaphthylzinc and bis(pentafluorophenyl)zinc; an alkylzinc halide such as methylzinc chloride, ethylzinc chloride, propylzinc chloride, n-butylzinc chloride, isobutylzinc chloride, n-hexylzinc chloride, methylzinc bromide, ethylzinc bromide, propylzinc bromide, n-butylzinc bromide, isobutylzinc bromide, n-hexylzinc bromide, methylzinc iodide, ethylzinc iodide, propylzinc iodide, n-butylzinc iodide, isobutylzinc iodide and n-hexylzinc iodide; and a zinc halide such as zinc fluoride, zinc chloride, zinc bromide and zinc iodide.

The component (a) is preferably a dialkylzinc, further preferably dimethylzinc, diethylzinc, dipropylzinc, di-n-butylzinc, diisobutylzinc, di-n-hexylzinc, diallylzinc or bis(cyclopentadienyl)zinc, and particularly preferably dimethylzinc or diethylzinc.

In the above formula [2], examples of the non-metal atom of T¹ of the Group 15 are a nitrogen atom and a phosphorous atom, and examples of the non-metal atom of T¹ of the Group 16 are an oxygen atom and a sulfur atom. T¹ is preferably a nitrogen atom or an oxygen atom, and particularly preferably an oxygen atom.

In the above formula [2], when T¹ is a non-metal atom of the Group 15, s is 3, and when T¹ is a non-metal atom of the Group 16, s is 2.

In the formula [2], as an index of the electron-withdrawing property, the substituent constant a of the Hammet's rule is known, and a functional group, in σ which the substituent constant σ of the Hammet's rule is positive, can be mentioned as an electron-withdrawing group.

Examples of the electron-withdrawing group are a fluorine atom, a chlorine atom, a bromine atom, an iodine atom, a cyano group, a nitro group, a carbonyl group, a sulfonyl group, and a phenyl group. Examples of a group containing an electron-withdrawing group are a halog enated hydrocarbon group such as a halogenated alkyl group and a halogenated aryl group; a cyanated hydrocarbon group such as a cyanated aryl group; a nitrated hydrocarbon group such as a nitrated aryl groups; a hydrocarbonoxy carbonyl group such as an alkoxycarbonyl group, an aralkyloxycarbonyl group and an aryloxycarbonyl group; and an acyloxy group.

Examples of the halogenated alkyl group as R¹ are a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, and a 1,1-bis(triiodomethyl)-2,2,2-triiodoethyl group.

Examples of the halogenated aryl group as R¹ are aryl groups in which a hydrogen atom of an aromatic ring in the group is substituted with a halogen such as a 2-fluorophenyl group, a 3-fluorophenyl group, a 4-fluorophenyl group, 2-chlorophenyl group, a 3-chlorophenyl group, a 4-chlorophenyl group, a 2-bromophenyl group, a 3-bromophenyl group, a 4-bromophenyl group, a 2-iodophenyl group, a 3-iodophenyl group, a 4-iodophenyl group, a 2,6-difluorophenyl group, a 3,5-difluorophenyl group, a 3,4,5-trifluorophenyl group, a 2,6-dichlorophenyl group, a 3,5-dichlorophenyl group, a 2,6-dibromophenyl group, a 3,5-dibromophenyl group, a 2,6-diiodophenyl group, a 3,5-diiodophenyl group, a 2,4,6-trifluorophenyl group, a 2,4,6-trichlorophenyl group, a 2,4,6-tribromophenyl group, a 2,4,6-triiodophenyl group, a pentafluorophenyl group, a pentachlorophenyl group, a pentabromophenyl group, and a pentaiodophenyl group.

Further, examples of the (halogenated alkyl)aryl group as R¹ are aryl groups substituted with a halogenated alkyl group such as a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group, and a 2,4,6-tris(trifluoromethyl)phenyl group.

Examples of the cyanated aryl group as R¹ are a 2-cyanophenyl group, a 3-cyanophenyl group and a 4-cyanophenyl group.

Examples of the nitrated aryl group as R¹ are a 2-nitrophenyl group, a 3-nitrophenyl group and a 4-nitrophenyl group.

Examples of the alkoxycarbonyl group as R¹ are a methoxycarbonyl group, an ethoxycarbonyl group, a n-propoxycarbonyl group, an isopropoxycarbonyl group and a trifluoromethoxycarbonyl group.

An example of the aralkyloxycarbonyl group as R¹ is a benzyloxycarbonyl group.

Examples of the aryloxycarbonyl group as R¹ are a phenoxycarbonyl group and a pentafluorophenoxycarbonyl group.

Examples of the acyloxycarbonyl group as R¹ are a methycarbonyloxy group and an ethylcarbonyloxy group.

R¹ is preferably a halogenated hydrocarbon group; more preferably a halogenated alkyl group or a halogenated aryl group; further preferably a fluoroalkyl group, a fluoroaryl group, a chloroalkyl group or a chloroaryl group; furthermore preferably a fluoroalkyl group or a fluoroaryl group; particularly preferably a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 4-fluorophenyl group, a 2,6-difluorophenyl group, a 3,5-difluorophenyl group, a 2,4,6-trifluorophenyl group, a 3,4,5-trifluorophenyl group or a pentafluorophenyl group; and most preferably a trifluoromethyl group, a 2,2,2-trifluoro-1-trifluoromethylethyl group, a 1,1-bis(trifluoromethyl)-2,2,2-trifluoroethyl group, a 3,4,5-trifluorophenyl group, or a pentafluorophenyl group.

When the compound (b) represented by the above formula [2] is an amine, examples thereof are di(fluoromethyl)amine, di(chloromethyl)amine, di(bromomethyl)amine, di(Iodomethyl)amine, bis(difluoromethyl)amine, bis(dichloromethyl)amine, bis(dibromomethyl)amine, bis(diiodomethyl)amine, bis(trifluoromethyl)amin bis(trichloromethyl)amine, bis(tribromomethyl)amine, bis(triiodomethyl)amine, bis(2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3- pentachloropropyl)amine, bis(2,2,3,3,3-pentabromopropyl) amine, bis(2,2,3,3,3-pentaiodopropyl)amine, bis(2,2,2-trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine, bis(3,5-dibromophenyl)amine, bis(2,6-diiodophenyl)amine, bis(3,5-diiodophenyl)amine, bis(2,4,6-trifluorophenyl) amine, bis(2,4,6-trichlorophenyl)amine, bis(2,4,6-tribromophenyl)amine, bis(2,4,6-triiodophenyl)amine, bis(pentafluorophenyl)amine, bis(pentachlorophenyl)amine, bis (pentabromophenyl)amine, bis(pentaiodophenyl)amine, bis (2-(trifluoromethyl)phenyl)amine, bis(3-(trifluoromethyl) phenyl)amine, bis(4-(trifluoromethyl)phenyl)amine, bis(2,6-di(trifluoromethyl)phenyl)amine, bis(3,5-di (trifluoromethyl)phenyl)amine, bis(2,4,6-tri (trifluoromethyl)phenyl)amine, bis(2-cyanophenyl)amine, bis(3-cyanophenyl)amine, bis(4-cyanophenyl)amine, bis(2-nitrophenyl)amine, bis(3-nitrophenyl)amine and bis(4-nitrophenyl)amine.

When the compound (b) is a phosphine, examples thereof are phosphine compounds in which a nitrogen atom is replaced with a phosphorus atom in the above-mentioned amine compounds.

When the compound (b) is an alcohol, examples thereof are fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1-bis(trifluoromethyl)-2,2,2-trifluoroethanol, 1,1-bis(trichloromethyl)-2,2,2-trichloroethanol, 1,1-bis(tribromomethyl)-2,2,2-tribromoethanol and 1,1-bis(triiodomethyl)-2,2,2-triiodoethanol, When the compound (b) is a thiol compound, examples thereof are thiol compounds in which an oxygen atom is replaced with a sulfur atom in the above-mentioned alcohol compounds.

When the compound (b) is a phenol, examples thereof are 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,6-difluorophenol, 3,5-difluorophenol, 2,6-dichlorophenol, 3,5-dichlorophenol, 2,6-dibromophenol, 3,5-dibromophenol, 2,6-diiodophenol, 3,5-diiodophenol, 2,4,6-trifluorophenol, 3,4,5-trifluorophenol, 2,4,6-trichlorophenol, 2,4,6-trichlorophenol, 2,4,6-tribromophenol, 2,4,6-triiodophenol, pentafluorophenol, pentachlorophenol, pentabromophenol, pentaiodophenol, 2-(trifluoromethyl)phenol, 3-(trifloromethyl)phenol, 4-(trifluoromethyl)phenol, 2,6-bis(trifluoromethyl)phenol, 3,5-bis(trifluoromethyl)phenol, 2-cyanophenol, 3-cyanophenol, 4-cyanophenol, 2-nitrophenol, 3-nitrophenol and 4-nitrophenol.

When the compound (b) is a thiophenol compound, examples thereof are thiophenol compounds in which an oxygen atom is replaced with a sulfur atom in the above-mentioned phenol compounds.

When the compounds (b) is a carboxylic acid, examples thereof are 2-fluorobenzoic acid, 3-fluorobenzoic acid, 4-fluorobenzoic acid, 2,3-difluorobenzoic acid, 2,4-difluorobenzoic acid, 2,3,5-difluorobenzoic acid, 2,6-difluorobenzoic acid, 2,3,4-trifluorobenzoic acid, 2,3,5-trifluorobenzoic acid, 2,3,6-trifluorobenzoic acid, 2,4,5-trifluorobenzoic acid, 2,4,6-trifluorobenzoic acid, 2,3,4,5-tetrafluorobenzoic acid, 2,3,4,6-tetrafluorobenzoic acid, pentafluorobenzoic acid, fluoroacetic acid, difluoroacetic acid, trifluoroacetic acid, pentafluoropropanoic acid, heptafluorobutanoic acid and 1,1-bis(trifluoromethyl)-2,2,2-trifluoroehtanoic acid.

When the compounds (b) is a sulfonic acid, examples thereof are fluoromethanesulfonic acid, difluoromethanesulfonic acid, trifluoromethanesulfonic acid, pentafluoroethanesulfonic acid, heptafluoropropanesulfonic acid, and 1,1-bis(trifluoromethyl)-2,2,2-trifluoroehtane sulfonic acid.

A preferable amine of the compound (b) is bis(trifluoromethyl)amine, bis(2,2,2-trifluoromethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine or bis(pentafluorophenyl)amine; preferable alcohols thereof are trifluoromethanol, 2,2,2-trifluoroethanol, 2,2,3,3,3-pentafluoropropanol, 2,2,2-trifluoro-1-trifluoromethylethanol or 1,1-bis(trifluoromethyl)-2,2,2-trifluoroethanol; a preferable phenol thereof is 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol or 2,4,6-tris(trifluoromethyl)phenol; preferable carboxylic acid thereof is pentafluorobenzoic acid or trifluoroacetic acid; and a preferable sulfonic acid thereof is trifluoromethanesulfonic acid.

A more preferable compound (b) is bis(trifluoromethyl)amine, bis(pentafluorophenyl)amine, trifluoromethanol, 2,2,2-trifluoro-1-trifluoromethylethanol, 1,1-bis(trifluoromethyl)-2,2,2-trifluoroethanol, 4-fluorophenol, 2,6-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol; and a further preferable compound (b) is 3,4,5-trifluorophenol, pentafluorophenol or 1,1-bis(trifluoromethyl)-2,2,2-trifluoroethanol.

In the above formula [3], examples of the non-metal atom of $T^2$ of the Group 15 are a nitrogen atom and a phosphorous atom, and examples of the non-metal atom of $T^2$ of the Group 16 are an oxygen atom and a sulfur atom. $T^2$ is preferably a nitrogen atom or an oxygen atom, and particularly preferably an oxygen atom.

In the above formula [3], when $T^2$ is a non-metal atom of the Group 15, t is preferably 3, and when $T^2$ is a non-metal atom of the Group 16, t is preferably 2.

Examples of the hydrocarbon group as $R^2$ are hydrocarbon groups as $L^1$, and halogenated hydrocarbon groups as $R^1$ mentioned above, respectively.

$R^2$ is preferably a halogenated hydrocarbon group, and further preferably a fluorinated hydrocarbon group.

The component (c) is preferably water, hydrogen sulfide, an alkylamine, an arylamine or an aralkylamine; and more preferably water, hydrogen sulfide, methylamine, ethylamine, n-propylamine, isopropylamine, n-butylamine, sec-butylamine, tert-butylamine, isobutylamine, n-pentylamine, neopentylamine, isoamylamine, n-hexylamine, n-octylamine, n-decylamine, n-dodecylamine, n-pentadecylamine, n-eicosylamine, allylamine, cyclopentadienylamine, aniline, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, ethylaniline, n-propylaniline, isopropylaniline, n-butylaniline, sec-butylaniline, tert-butylaniline, n-pentylaniline, neopentylaniline, n-hexylaniline, n-octylaniline, n-decylaniline, n-dodecylaniline, n-tetradecylaniline, naphthylamine, anthracenylamine, benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl) methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl) methylamine, (3,4,5-trimethylphenyl)methylamine, (2,4,6-trimethylphenyl)methylamine, (2,3,4,5-tetramethylphenyl) methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butylphenyl)methylamine, (sec-butylphenyl)methylamine, (tert-butylphenyl)methylamine, (n-pentylphenyl)methylamine, (neopentylphenyl)methylamine, (n-hexylphenyl) methylamine, (n-octylphenyl)methylamine, (n-decylphenyl) methylamine, (n-tetradecylphenyl)methylamine, naphtylmethylamine, anthracenylmethylamine, fluoromethylamine, chloromethylamine, bromomethylamine, iodomethylamine, difluoromethylamine, dichloromethylamine, dibromomethylanine, diiodomethylamine, trifluoromethylamine, trichloromethylamine, tribromomethylamine, triiodomethylamine, 2,2,2-trifluoroethylamine, 2,2,2-trichloroethylamine, 2,2,2-tribromoethylamine, 2,2,2-triiodoethylamine, 2,2,3,3,3-pentafluoropropylamine, 2,2,3,3,3-pentachloropropylamine, 2,2,3,3,3-pentabromopropylamine, 2,2,3,3,3-pentaiodopropylamine, 2,2,2-trifluoro-1-trifluoromethylethylamine, 2,2,2-trichloro-1-trichloromethylethylamine, 2,2,2-tribromo-1-tribromomethylethylamin, 2,2,2-triiodo-1-triiodomethylethylamine, 1,1-bis(trifluoromethyl)-2,2,2-trifluoroethylamine, 1,1-bis (trichloromethyl)-2,2,2-trichloroethylamine, 1,1-bis(tribromomethyl)-2,2,2-tribromoethylamine, 1,1-bis(triiodomethyl)-2,2,2-triiodoethylamine, 2-fluoroaniline, 3-fluoroaniline, 4-fluoroaniline, 2-chloroaniline, 3-chloroaniline, 4-chloroaniline, 2-bromoaniline, 3-bromoaniline, 4-bromoaniline, 2-iodoaniline, 3-iodoaniline, 4-iodoaniline, 2,6-difluoroaniline, 3,5-difluoroaniline, 2,6-dichloroaniline, 3,5-dichloroaniline, 2,6-dibromoaniline, 3,5-dibromoaniline, 2,6-diiodoaniline, 3,5-diiodoaniline, 2,4,6-trifluoroaniline, 2,4,6-trichloroaniline, 2,4,6-tribromoaniline, 2,4,6-triiodoaniline, pentafluoroaniline, pentachloroaniline, pentabromoaniline, pentaiodoaniline, 2-(trifluoromethyl) aniline, 3-(trifluoromethyl)aniline, 4-(trifluoromethyl) aniline, 2,6-di(trifluoromethyl)aniline, 3,5-di(trifluoromethyl)aniline or 2,4,6-tri(trifluoromethyl)aniline.

The component (c) is further preferably water, hydrogen sulfide, methylamine, ethylamine, n-propylamine, isopropylamine, n-butylamine, sec-butylamine, tert-butylamine, isobutyl amine, n-octylamine, aniline, 2,6-xylylamine, 2,4,6-trimethylaniline, naphthylamine, anthracenylamine, benzylamine, trifluoromethylamine, pentafluoroethylamine, perfluoroproylamine, perfluorobutylamine, perfluoropentylamine, perfluorohexylamine, perfluorooctylamine, perfluorododecylamine, perfluoropentadecylamine, perfluoroeicosylamine, 2-fluoroanilin, 3-fluoroaniline, 4-fluoroaniline, 2,6-difluoroaniline, 3,5-difluoroaniline, 2,4,6-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline or 2,4,6-tris(trifluoromethyl)aniline; particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline or 2,4,6-tris(trifluoromethyl) aniline; and most preferably water or pentafluoroaniline.

The component (d) in the present invention is a nonionic surfactant having no active hydrogen, wherein the active hydrogen means a hydrogen atom bound to a nitrogen atom, an oxygen atom or a sulfur atom.

Examples of said nonionic surfactant are a tertiary amine, an ether, a thioether, a diester derived from polyethylene glycol and a fatty acid, and an amine oxide.

As the component (d), preferred is a compound represented by the following formula [4]:

$$R^3{}_mZ \qquad [4],$$

wherein $R^3$ is a hydrocarbon group, and respective $R^3$'s may be the same or different from one another; Z is a nitrogen atom, an oxygen atom or a sulfur atom; and m is a valence of Z.

Z is preferably a nitrogen atom or an oxygen atom, and more preferably a nitrogen atom.

When Z is a nitrogen atom, m is 3, and when Z is an oxygen atom or a sulfur atom, m is 2.

The hydrocarbon group in $R^3$ is preferably a chain hydrocarbon group, and more preferably an alkyl group or an alkenyl group.

Said alkyl group is preferably an alkyl group having 1 to 100 carbon atoms. Examples therof are a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a 2-ethylhexyl group, a n-octyl group, a n-decyl group, a n-undecyl group, a n-dodecyl group, a n-tridecyl group, a n-tetradecyl group, a n-pentadecyl group, a n-hexadecyl, group, a n-heptadecyl group, a n-octadecyl group, a n-nonadecyl group, a n-eicosyl group, a n-docosyl group, a 2-(3-methylhexyl)-7-methyldecyl group, and a long-chain alkyl group derived from a natural product (for example, coconut oil, soybean oil or beef tallow).

The alkenyl group as $R^3$ is preferably an alkenyl group having 1 to 100 carbon atoms. Examples therof are a 9-cis-octadecenyl group; and a long-chain alkenyl group derived from a natural product such as coconut oil, soybean oil and beef tallow.

The above-mentioned alkyl groups and alkenyl groups may be substituted with a halogen atom such as a fluorine atom, a chlorine atom, a bromine atom and an iodine atom.

In the formula [4], $R^3$ is preferably an alkyl group.

In the formula [4], it is preferable that at least one $R^3$ is a hydrocarbon group having from 12 to 100 carbon atoms, and it is more preferable that at least two $R^3$'s are hydrocarbon groups having from 12 to 100 carbon atoms. Said hydrocarbon group is preferably an alkyl group having from 12 to 100 carbon atoms; more preferably a n-dodecyl group, a n-tetradecyl group, a n-hexadecyl group, a n-octadecyl group, a n-eicosyl group, a n-docosyl group, a 2-(3-methylhexyl)-7-methyldecyl group or a long-chain alkyl group derived from a natural product (for example, coconut oil, soybean oil or beef tallow); further preferably a n-octadecyl group, a n-eicosyl group, a n-docosyl group, a 2-(3-methylhexyl)-7-methyldecyl group or a long-chain alkyl group derived from a natural product (for example, coconut oil, soybean oil or beef tallow); and particularly preferably a n-octadecyl group.

Specific examples of the compound represented by the above-mentioned formula [4] are tridecylamine, trihexadecylamine, N,N-dimethyl-n-dodecylamine, N,N-dimethyl-n-hexadecylamine, N,N-dimethyl-n-octadecylamine, N,N-dimethyl-cocoa-alkylamine, N,N-dimethyl-hydrogenated beef tallow-alkylamine, N,N-dimethyloleylamine, N,N-dimethyl-soybean-alkylamine, N,N-dimethyl-beef tallow-alkylamine, N,N-di-n-dodecylmethylamine, N,N-di-n-hexadecylmethylamine, N,N-di-n-octadecylmethylamine, N,N-dicocoa-alkylmethylamin, N,N-di-hydrogenated be f tallow-alkylmethylamine, N,N-di-n-oleylmethylamine, N,N-di-soybean-alkylmethylamine and N,N-di-beef tallow-alkylmethylamine. Preferred is N,N-di-n-octadecylmethylamine.

Regarding the amount of each of the components (a) to (c) contacted, when the molar ratio of those components contacted is component (a): component (b): component (c)=1: y: z, y and z satisfy preferably the following formula (I), and more preferably the following formula (II):

$$|r-y-2z| \leq 0.2 \quad (I)$$

$$r = y + 2z \quad (II)$$

wherein r is a valence of $M^1$.

The amount of the component (b) contacted is preferably from 0.01 to 1.99 mol, more preferably from 0.1 to 1.8 mol, further preferably from 0.2 to 1.5 mol, and particularly preferably from 0.3 to 1 mol, per one mol of the component (a).

The amount of the component (d) contacted is preferably from 0.01 to 0.7 mol, more preferably from 0.05 to 0.6 mol, further preferably from 0.08 to 0.5 mol, and particularly preferably from 0.1 to 0.4 mol, per one mol of the component (a).

The contact treatment of the above-mentioned components (a) to (d) is preferably carried out in an inert gas atmosphere. The treatment temperature is usually from $-100$ to $200°$ C., and preferably from $-80$ to $150°$ C. The treatment time is usually from 1 minute to 36 hours, and preferably from 10 minutes to 24 hours.

In the treatment, a solvent maybe used, or these compounds may be directly contact-treated using no solvent. There can be used any solvent selected from a non-polar solvent such as an aliphatic hydrocarbon solvent and an aromatic hydrocarbon solvent, and a polar solvent such as a halogenated solvent and na etheral solvent, which is inert to the compounds (a) to (d). Examples of the solvent are butane, pentane, hexane, heptane, octane, 2,2,4-trimethylpentane, cyclohexane, benzene, toluene, xylene, dimethyl ether, diethyl ether, diisopropyl ether, di-n-butyl ether, methyl tert-butyl ether, anisole, 1,4-dioxane, 1,2-dimethoxyethane, bis(2-methoxyethyl)ether, tetrahydrofuran and tetrahydropyran, Among them, a hydrocarbon solvent is further preferable, and toluene is most preferable.

Examples of a method for contacting the components (a) to (d) are as follows.

① A method comprising the steps of (i) contacting the component (a) with the component (b), (ii) contacting (c), and (iii) further contacting the component (d).

② A method comprising the steps of (i) contacting the component (a) with the component (b), (ii) contacting (d), and (iii) further contacting the component (c).

③ A method comprising the steps of (i) contacting the component (a) with the component (c), (ii) contacting (b), and (iii) further contacting the component (d).

④ A method comprising the steps of (i) contacting the component (a) with the component (c), (ii) contacting (d), and (iii) further contacting the component (b).

⑤ A method comprising the steps of (i) contacting the component (a) with the component (d), (ii) contacting (b), and (iii) further contacting the component (c).

⑥ A method comprising the steps of (i) contacting the component (a) with the component (d), (ii) contacting (e), and (iii) further contacting the component (b).

⑦ A method comprising the steps of (i) contacting the component (b) with the component (c), (ii) contacting (a), and (iii) further contacting the component (d).

⑧ A method comprising the steps of (i) contacting the component (b) with the component (c), (ii) contacting (d), and (iii) further contacting the component (a).

⑨ A method comprising the steps of (i) contacting the component (b) with the component (d), (ii) contacting (a), and (iii) further contacting the component (c).

⑩ A method comprising the steps of (i) contacting the component (b) with the component (d), (ii) contacting (c), and (iii) further contacting the component (a).

⑪ A method comprising the steps of (i) contacting the component (c) with the component (d), (ii) contacting (a), and (iii) further contacting the component (b).

⑫ A method comprising the steps of (i) contacting the component (c) with the component (d), (ii) contacting (b), and (iii) further contacting the component (a).

Preferred is a method comprising the steps of (i) contacting the components (a), (b) and (c), and then (ii) contacting the component (d), or a method comprising the steps of (i) contacting the components (a), (b) and (d), and then (ii) contacting the component (c); and more preferred is the above-mentoined method ① or ②.

Further, there may be carried out either a method comprising the steps of:

(i) contacting any components selected from the components (a) to (d) to obtain a contact product, and (ii) contacting the contact product with the remaining component(s), or a method comprising the steps of:

(i) contacting any components selected from the components (a) to (d) to obtain a contact product, (ii) purifying the contact product to obtain a purified contact product, and (iii) contacting the purified contact product with the remaining component(s).

The contact product according to the present invention, which is obtained by the process comprising the step of contacting the components (a) to (d), may contain starting materials (namely, the components (a) to (d)) as unreacted matrials.

When the compounds (a) to (d) are diethylzinc, pentafluorophenol, water and methyldioctadecylamine, respectively, an example of the process for producing the contact product according to the present inveniton comprises the steps of:

(1) adding a hexane solution of diethylzinc to toluene as a solvent, (2) adding thereto dropwise pentafluorophenol and water in the same molar amount as that of diethylzinc and in a half molar amount thereof, respectively, (3) stirring for from 10 minutes to 24 hours at 70° C., (4) adding methyldioctadecylamine in an amount of 0.2 time by mole to diethylzinc, and (5) stirring for from 10 minutes to 24 hours at 70° C.

The contact product (hereinafter, referred to as "contact product (A)") according to the present invention can preferably be used as a catalyst component of a catalyst for addition polymerization. Examples of the catalyst for addition polymerization using said catalyst component are (1) a catalyst obtained by a process comprising the step of contacting the contact product (A) with a compound (hereinafter, referred to as "compound (B)") of a metal selected from the group consisting of metals of the Groups 3 to 12 and Lanthanide Series of the Periodic Table, and (2) a catalyst obtained by a process comprising the step of contacting the contact product (A) with the compound (B) and an organoaluminum compound (hereinafter, referred to as "compound (C)"). Preferred is the above latter catalyst.

Examples of the compound (B) are a metal compound represented by the following formula [5], and a μ-oxo type metal compound thereof;

$$L^2{}_a M^2 X^1{}_b \qquad [5],$$

wherein a is a number satisfying $0<a\leqq 8$ depending upon a valence of $M^2$; b is a number satisfying $0<b\leqq 8$ depending upon a valence of $M^2$; $M^2$ is a metal atom of the Groups 3 to 12 or Lanthanide Series of the Periodic Table of the Elements; $L^2$ is a group having a cyclopentadienyl type anion skeleton, or a group containing a hetero-atom, a plurality of $L^2$ groups may be the same or different each other, and a plurality of $L^2$ groups may be optionally linked in direct, or through a group containing a carbon atom, a silicon atom, a nitrogen atom, an oxygen atom, a sulfur atom or a phosphorus atom; $X^1$ is a halogen atom, a hydrocarbon group (excluding the group having a cyclopentadienyl type anion skeleton) or a hydrocarbonoxy group, and a plurality of $X^1$ groups may be the same or different each other.

Examples of $M^2$ are a scandium atom, an yttrium atom, a titanium atom, a zirconium atom, a hafnium atom, a vanadium atom, a niobium atom, a tantalum atom, a chromium atom, a molybdenum atom, a tungsten atom, a manganese atom, a technetium atom, an iron atom, a ruthenium atom, a cobalt atom, a rhodium atom, a nickel atom and a palladium atom. $M^2$ is preferably a metal atom of the Groups 3 to 11, further preferably a metal atom of the Groups 3 to 7, and particularly preferably a metal atom of the Group 4.

Examples of the group having a cyclopentadienyl type anion skeleton as $L^2$ are an $\eta^5$-(substituted)cyclopentadienyl group, an $\eta^5$-(substituted)indenyl group, and an $\eta^5$-(substituted)fluorenyl group. Specific examples thereof are an $\eta^5$-cyclopentadienyl group, an $\eta^5$-methylcyclopentadienyl group, an $\eta^5$-tert-butylcyclopentadienyl group, an $\eta^3$-1,2-dimethylcyclopentadienyl group an $\eta^5$-1,3-dimethylcyclopentadienyl group, an $\eta^5$-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1, 2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4,5-benzindenyl group, an $\eta^5$-2-methyl-4,5-benzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group and an $\eta^5$-2,7-di-tert-butylfluorenyl group; and substitution groups thereof.

Examples of the hetero-atom in the group containing a hetero-atom as $L^2$ are an oxygen atom, a sulfur atom, a nitrogen atom and a phosphorus atom. Examples of the group containing a hetero-atom are an alkoxy group; an aryloxy group; a thioalkoxy group; a thioaryloxy group; an alkylamino group; an arylamino group; an alkylphosphino group; an arylphosphino group; an aromatic or aliphatic heterocyclic group containing in its ring at least one atom selected from the group consisting of an oxygen atom, a sulfur atom, a nitrogen atom and a phosphorus atom; and a chelating ligand.

Examples of the group containing a hetero-atom are a methoxy group, an ethoxy group, a n- or iso-propoxy group, a n-, sec-, iso- or tert-butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 4-tert-butyl-4-methylphenoxy group, a 2,6-di-tert-butylphenoxy group, a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a di-n- or iso-propylamino group, a diphenylamino group, an isopropylamino group, a tart-butylamino group, a pyrrolyl group, a dimethylphosphino group, a 2-(2-oxy-1-propyl)phenoxy group, a catecholato group, a 2-hydoroxyphenoxy group, a resorcinolate group, a 3-hydoroxyphenoxy group, a 4-isopropylostecholato group, a 4-isopropyl-2-hydoroxyphenoxy group, a 3-methoxycatecholato group, a 4-methoxy-2-hydoroxyphenoxy group, a 1,8-dihydroxynahpthyl group, a 1,2-dihydroxynahpthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group, and a 4,4',6,6'-tetramethyl-2,2'-isobutylidenediphenoxy group.

A further example of the hetero atom-containing group is a group represented by the following formula [6]:

$$R^4{}_3 P=N— \qquad [6]$$

wherein $R^4$ is a hydrogen atom, a halogen atom or a hydrocarbon group, three $R^4$ groups may be the same or different, and two or more thereof may be bonded mutually, or may form a ring.

Examples of $R^4$ in the formula [6] are a hydrogen atom, a fluorine atom, a chlorine atom, a bromine atom, an iodine atom, a methyl group, an ethyl group, a n-propyl group, an isopropyl group, a n-butyl group, a tert-butyl group, a cyclohexyl group, a phenyl group, a 1-naphtyl group and a benzyl group.

A still further example of the hetero atom-containing group is a group represented by the following formula [7]:

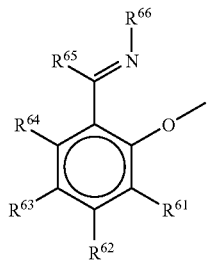

[7]

wherein respective $R^{61}$ to $R^{66}$ groups are independently a hydrogen atom, a halogen atom, a hydrocarbon group, a hydrocarbon oxy group, a silyl group or an amino group, they may be the same or different, and two or more thereof may be bonded mutually, or may form a ring.

Examples of $R^{61}$ to $R^{66}$ in the above formula [7] are a hydrogen atom, a fluorine atom, a chlorine atom, a bromine atom, an iodine atom, a phenyl group, a 1-naphtyl group, a 2-naphtyl group, a tert-butyl group, a 2,6-dimethylphenyl group, a 2-fluorenyl group, a 2-methylphenyl group, a 4-trifluoromethylphenyl group, a 4-methoxyphenyl group, a 4-pyridyl group, a cyclohexyl group, a 2-isopropylphenyl group, a benzyl group, a methyl group, a triethylsilyl group, a diphenylmethylsilyl group, a 1-methy-1-phenylethyl group, a 1,1-dimethyl propyl group and a 2-chlorophenyl group.

The above-mentioned chelating ligand as $L^2$ means a ligand having plural coordinating positions. Examples thereof are acetylacetonate, diimine, oxazoline, bisoxazoline, terpyridine, acylhydrazone, diethylenetriamine, triethylenetetramine, porphyrin, crown ether and cryptate.

Examples of the above-mentioned group, through which plural $L^2$ groups are linked, are an alkylene group such as an ethylene group, a propylene group, a dimethylmethylene group and a diphenylmethylene group; a silylene group such as a silylene group, a dimethylsilylene group, a diphenylsilylene group and a tetramethyldisilylene group; and a hetero-atom such as a nitrogen atom, an oxygen atom, a sulfur atom and a phosphorus atom.

Examples of the halogen atom as $X^1$ in the formula [5] are a fluorine atom, a chlorine atom, a bromine atom and an iodine atom. Examples of the hydrocarbon group as $X^1$ are an alkyl group, an aralkyl group, an aryl group and an alkenyl group.

Examples of the alkyl group as $X^1$ in the formula [5] are a methyl group, an ethyl group, a n-propyl group, an isopropyl group, a n-butyl group, a sec-butyl group, a tert-butyl group, an isobutyl group, a n-pentyl group, a neopentyl group, a tert-pentyl group, a n-hexyl group, a n-octyl group, a n-decyl group, a n-dodecyl group, a n-pentdecyl group and a n-eicosyl group.

Each of these alkyl groups may be substituted with a halogen atom such as a fluorine atom, a chlorine atom, a bromine atom and an iodine atom. Examples of such an alkyl group are a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group and a perbromopropyl group.

Further, these alkyl groups may be substituted with an alkoxy group such as a methoxy group and an ethoxy group; an aryloxy group such as a phenoxy group; or an aralkyloxy group such as a benzyloxy group.

The alkyl group as $X^1$ in the formula [5] is preferably an alkyl group having 1 to 20 carbon atoms, and more preferably a methyl group, an ethyl group, an isopropyl group, a tert-butyl group, an isobutyl group or a tert-pentyl group.

Examples of the aralkyl group as $X^1$ in the formula [5] are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (tetradecylphenyl)methyl group, a naphthylmethyl group and an anthracenylmethyl group.

Each of these aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group: or an aralkyloxy group such as a bentyloxy group.

The aralkyl group as $X^1$ in the formula [5] is preferably an aralkyl group having 7 to 20 carbon atoms, and more preferably a benzyl group.

Examples of the aryl group as $X^1$ in the formula [5] are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group.

Each of these aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The aryl group is preferably an aryl group having 6 to 20 carbon atoms, and more preferably a phenyl group.

Examples of the hydrocarbonoxy group as $X^1$ in the formula [5] are an alkoxy group, an aryloxy group and an aralkyloxy group. Preferred is an alkoxy group having 1 to 20 carbon atoms, an aryloxy group having 6 to 20 carbon atoms, or an aralkyloxy group having 7 to 20 carbon atoms. Examples thereof are hydrocarbonoxy groups as above-exemplified as $L^1$, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group and a benzyloxy group. More preferred is a methoxy group, an ethoxy group, an isopropoxy group, a tert-butyl group, an isobutoxy group, a phenoxy group, a 2,6-di(tert-butyl)phenoxy group or a benzyloxy group; further preferred is a methoxy group, a phenoxy group, a 2,6-di(tert-butyl)phenoxy group or a benzyloxy group; and particularly preferred is a methoxy group or a phenoxy group.

$X^1$ is more preferably a chlorine atom, a methyl group, an ethyl group, a n-propyl group, an isopropyl group, a n-butyl group, a benzyl group, an allyl group, a methallyl group, a methoxy group, an ethoxy group or a phenoxy group, and further preferably a chlorine atom, a methyl group, a methoxy group or a phenoxy group.

Examples of the metal compound represented by the formula [5], wherein $M^2$ is a titanium atom, are dimethylsilylenebis(cyclopentadienyl)titanium dichloride, dimethylsilylenebis(2-methylcyclopentadienyl)titanium dichloride, dimethylsilylenebis(3-methylcyclopentadienyl)titanium dichloride, dimethylsilylenebis(2-n-butylcyclopentadienyl) titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichlorid, dimethylsilylenebis(2,5-dimethyloyclopentadienyl)titanium dichloride, dimethylsilylenebis(3,4-dimethylcyclopentedienyl)titanium dichloride, dimethylsilylensbis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, is dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene(methylcyclopentadienyl)(indenyl)titanium dichloride, dimethylsilylene(n-butyloyclopentadienyl)(indenyl)titanium dichloride, dimethylsilylene(tetramethylcyclopentadienyl)(indenyl)titanium dichloride, dimethylsilylene(cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene(tetramethylcyclopentadienyl)(fluorenyl)titanium dichloride, and dimethylsilylene(indenyl)(fluorenyl)titanium dichloride; and compounds obtained by changing "dimethylsilylene" in the above compounds to "diethylsilylene", "diphenylsilylene" or "dimethoxysilylene".

Further examples of the metal compound represented by the formula [5], wherein $M^2$ is a titanium atom, are bis(cyolopentadienyl)titanium dichloride, bis(methylcyclopentadienyl)titanium dichloride, bis(n-butylcyclopentadienyl) titanium dichloride, bis(dimethylcyclopentadienyl)titanium dichloride, bis(ethylmethylcyclopentadienyl)titanium dichloride, bis(trimethylcyclopentadienyl)titanium dichloride, bis(tetramethylcyclopentadienyl)titanium dichloride, bin(pentamethylcyclopentadienyl)titanium dichloride, bis(indenyl)titanium dichloride, bis(4,5,6,7-tetrahydroindenyl)titanium dichloride, bis(fluorenyl)titanium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl)titanium dichloride, cyclopentadienyl(2-phenylindenyl)titanium dichloride, pentamethylcyclopentadienyl(2-phenylindenyl)titanium dichloride, ethylenebis(cyclopentadienyl)titanium dichloride, ethylenebis(2-methylcyclopentadienyl)titanium dichloride, ethylenebis(3-methylcyclopentadienyl)titanium dichloride, ethylenebis(2-n-butylcyclopentadienyl)titanium dichloride, ethylenebis(3-n-butylcyclopentadienyl)titanium dichloride, ethylenebis(2,3-dimethylcyclopentadienyl)titanium dichloride, ethylenebis(2,4-dimethylcyclopentadienyl) titanium dichloride, ethylenebis(2,5-dimethylcyclopentadienyl)titanium dichloride, ethylenebis(3,4-dimethyloyclopentadienyl)titanium dichloride, ethylenebis(2,3-ethylmethylcyclopentadienyl)titanium dichloride, ethylenebis(2,4-ethylmethylcyclopentadienyl)titanium dichloride, ethylenebis(2,5-ethylmethylcyclopentadienyl)titanium dichloride, ethylenebis(3,5-ethylmethylcycl pentadienyl)titanium dichloride, ethylenebis(2,3,4-trimethylcyclopentadienyl)titanium dichloride, ethylenebis(2,3,5-trimethylcyclopentadienyl)titanium dichloride, ethylenebis(tetramethylcyclopentadienyl)titanium dichloride, ethylenebis(indenyl)titanium dichloride, ethylenebis(4,5,6,7-tetrahydroindenyl)titanium dichloride, ethylenebis(2-phenylindenyl)titanium dichloride, ethylenebis(fluorenyl)titanium dichloride, ethylene(cyclopentadienyl)(pentamethylcyclopentadienyl)titanium dichloride, ethylene(cyclopentadienyl)(indenyl)titanium dichloride, ethylene(methylcyclopentadienyl)(indenyl)titanium dichloride, ethylene(n-butylcyclopentadienyl)(indenyl)titanium dichloride, ethylene(tetramethylcyclopentadienyl)(indenyl)titanium dichloride, ethylene(cyclopentadienyl)(fluorenyl)titanium dichloride, ethylene(methylcyclopentadienyl)(fluorenyl)titanium dichloride, ethylene(pentamethylcyclopentadienyl)(fluorenyl)titanium dichloride, ethylene(n-butylcyclopentadienyl)(fluorenyl)titanium dichloride, ethylene(tetramethylpentadienyl)(fluorenyl)titanium dichloride, ethylene(indenyl)(fluorenyl)titanium dichloride, isopropylidenebis(cyclopentadienyl)

titanium dichloride, isopropylidenebis(2-methylcyclopentadienyl)titanium dichloride, isopropylidenebis(3-methylcyclopentadienyl)titanium dichloride, isopropylidenebis(2-n-butylcyclopentadienyl)titanium dichloride, isopropylidenebis(3-n-butylcyclopentadienyl)titanium dichloride, isopropylidenebis(2,3-dimethylcyclopentadienyl)titanium dichloride, isopropylidenebis(2,4-dimethylcyclopentadienyl)titanium dichloride, isopropylidenebis(2,5-dimethylcyclopentadienyl)titanium dichloride, isopropylidenebis(3,4-dimethylcyclopentadienyl)titanium dichloride, isopropylidenebis(2,3-ethylmethylcyclopentadienyl)titanium dichloride, isopropylidenebis(2,4-ethylmethylcyclopentadienyl)titanium dichloride, isopropylidenebis(2,5-ethylmethylcyclopentadienyl)titanium dichloride, isopropylidenebis(3,5-ethylmethylcyclopentadienyl)titanium dichloride, isopropylidenebis(2,3,4-trimethylcyclopentadienyl)titanium dichloride, isopropylidenebis(2,3,5-trimethylcyclopentadienyl)titanium dichloride, isopropylidenebis(tetramethylcyclopentadienyl)titanium dichloride, isopropylidenebis(indenyl)titanium dichloride, isopropylidenebis(4,5,6,7-tetrahydroindenyl)titanium dichloride, isopropylidenebis(2-phenylindenyl)titanium dichloride, isopropylidenebis(fluorenyl)titanium dichloride, isopropylidene(cyclopentadienyl)(tetramethylcyclopentadienyl)titanium dichloride, isopropylidene(cyclopentadienyl)(indenyl)titanium dichloride, isopropylidene(methylcyclopentadienyl)(indenyl)titanium dichloride, isopropylidene(n-butylcyclopentadienyl)(indenyl)titanium dichloride, isopropylidene(tetramethylcyclopentadienyl)(indenyl)titanium dichloride, isopropylidene(cyolopentadienyl)(fluorenyl)titanium dichloride, isopropylidene(methylcyclopentadienyl)(fluorenyl)titanium dichloride, isopropylidene(n-butylcyclopentadienyl)(fluorenyl)titanium dichloride, isopropylidene(tetramethylcyclopentadienyl)(fluorenyl)titanium dichloride, isopropylidene(indenyl)(fluorenyl)titanium dichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl(2,6-di-tert-butylphenyl)titanium dichloride, indenyl(2,6-diisopropylphenyl)titanium dichloride, fluorenyl(2,6-diisopropylphenyl)titanium dichloride, (tert-butylamido)tetramethylcyclopentadienyl-1,2-ethanediyltitanium dichloride, (methylamido)tetramethylcyclopentadienyl-1,2-ethanediyltitanium dichloride, (ethylamido)tetramethylcyclopentadienyl-1,2-ethanediyltitanium dichloride, (tert-butylamido)tetramethylcyclopentadienyl dimethylsilanetitanium dichloride, (benzylamido)tetramethylcyclopentadienyl dimethylsilanetitanium dichloride, (phenylphosphido)tetramethylcyclopentadienyl dimethylsilanetitanium dichloride, (tert-butylamido)indenyl-1,2-ethanediyltitanium dichloride, (tert-butylamido)tetrahydroindenyl-1,2-ethanediyl titanium dichloride, (tert-butylamido)fluorenyl-1,2-ethanediyltitanium dichloride, (tert-butylamido)indenyldimethylsilane titanium dichloride, (tert-butylamido)tetrahydroindenyldimethylsilane titanium dichloride, (tert-butylamido)fluorenyldimethylsilanetitanium dichloride, (dimeathylaminomethyl)tetramethylcyclopentadienyl titanium(III) dichloride, (dimethylaminoethyl) tetramethylcyclopentadienyl titanium(III) dichloride, (dimethylaminopropyl)tetramethylcyclopentadienyl-titanium (III) dichloride, (N-pyrrolidinylethyl)tetramethylcyclopentadienyl-titanium dichloride, (B-dimethylaminoborabenzene)cyclopentadienylzirconium dichloride, cyolopentadienyl(9-m sitylboraanthracenyl)zirconium dichloride, 2,2'-thiobis(4-methyl-6-tert-butylphenoxy)titanium dichloride, 2,2'-thiobis[4-methyl-6-(1-methylethyl)phenoxy]titanium dichloride, 2,2'-thiobis[4,6-dimethylphenoxy]titanium dichloride, 2,2'-methylenebis(4-methyl-6-tert-butylphenoxy)titanium dichloride, 2,2'-ethylenebis(4-methyl-6-tert-butylphenoxy)titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido]titanium dichloride, [bis(2,6-diisopropylphenyl)-1,3-propanediamido]titanium dichloride, [bis(2,6-di-tert-butylphenyl)-1,3-propanediamido]titanium dichloride, [bis(triisopropylsilyl)naphthalenediamido]titanium dichloride, [bis(trimethylsilyl)naphthalenediamido]titanium dichloride, [bis(tert-butyldimethylsilyl)naphthalendiamido]titanium dichloride, [bis(tert-butyldimethylsilyl)naphthalenediamido]titanium dibromide, cyclopentadienytitanium trichloride, pentamethylcyclopentadienyltitanium trichloride, [hydrotris(3,5-dimethylpyrazolyl)borate]titanium trichloride, [hydrotris(3,5-diethylpyrazolyl)borate]titanium trichlorlde, [hydrotris(3,5-di-tert-butylpyrazolyl)borate]titanium triohloride, [tris(3,5-dimethylpyrazolyl)methyl]titanium trichloride, [tris(3,5-dietnylpyrazolyl)methyl]titanium trichloride and [tris(3,5-di-tert-butylpyrazolyl)methyl]titanium trichloride.

Still further examples of the metal compound represented by the formula [5], wherein $M^2$ is a titanium atom, are compounds in which "dichloride" in the above-mentioned compounds is changed to "difluoride", "dibromide", "diodide", "dimethyl", "diethyl", "disopropyl", "diphenyl", "dibenzyl", "dimethoxide" "diethoxide", "di-n-propoxide", "diisopropoxide", "di-n-butoxide", "diisobutoxide", "di-tert-butoxide", "diphenoxide" or "di(2,6-di-tert-butylphenoxide", and compounds in which "trichloride" in the above-mentioned compounds is changed to "trifluoride", "tribromide", "triiodide", "trimethyl", "triethyl", "triisopropyl", "triphenyl", "tribenzyl", "trimethoxide", "triethoxide", "tri-n-propoxide", "triisopropoxide", "tri-n-butoxide", "tri-isobutoxide", "tri-tert-butoxid", "triphenoxide" or "tri(2,6-di-tert-butylphenoxide".

Examples of the metal compound represented by the formula [5], wherein $M^2$ is a zirconium atom or a hafnium atom, are those in which a "titanium atom" in the above-mentioned compounds is changed to a "zirconium atom" or a "hafnium atom".

Examples of the metal compound represented by the formula [5], wherein $M^2$ is a nickel atom, are 2,2'-methylenebis[(4R)-4-phenyl-5,5'-dimethyloxazoline]nickel dibromide, 2,2'-methylenebis[(4R)-4-phenyl-5,5'-diethyloxazoline]nickel dibromide, 2,2'-methylenebis[(4R)-4-phenyl-5,5'-di-n-propyloxazoline]nickel dibromide, 2,2'-methylenebis[(4R)-4-phenyl-5,5'-diisopropyloxazoline] nickel dibromide, 2,2'-methylenebis[(4R)-4-phenyl-5,5'-dicyclohexyloxazoline]nickel dibromide, 2,2'-methylenebis[(4R)-4-phenyl-5,5'-dimethoxyoxazoline]nickel dibromide, 2,2'-methylenebis[(4R)-4-phenyl-5,5'-diethoxyoxazoline] nickel dibromide, 2,2'-methylenebis[(4R)-4-phenyl-5,5'-diphenyloxazoline]nickel dibromide, methylenebis[(4R)-4-methyl-5,5'-di-(2-methylphenyl)oxazoline]nickel dibromide, methylenebis[(4R)-4-methyl-5,5$^1$-di-(3-methylphenyl)oxazoline]nickel dibromide, methylenebis[(4R)-4-methyl-5,5'-di-(4-methylphenyl)oxazoline]nickel dibromide, methylenebis[(4R)-4-methyl-5,5'-di-(2-methoxyphenyl)oxazolin]nickel dibromide, methylenebis[(4R)-4-methyl-5,5'-di-(3-methoxyphenyl)oxazoline]nickel dibromide, methylenebis[(4R)-4-methyl-5,5'-di-(4-methoxyphenyl)oxazoline]nickel dibromide, methylenebis[spiro{(4R)-4-methyloxazoline-5,1'-cyclobutane)}]nickel dibromide, methylenebis[spiro{(4R)-4-methyloxazoline-5,1'-cyclopentane}]nickel dibromide, methylenobis[spiro{(4R)-4-methyloxazoline-5,1'-cyclohexane}]nickel dibromide, methylenebis[spiro{(4R)-4-methyloxazoline-5,1'-cycloheptane}]nickel dibromide, 2,2'-methylenebis[(4R)-4-isopropyl-5,5-dimethyloxazoline]nickel dibromide, 2,2'-methylenebis[(4R)-4-isopropyl-5,5-diethyloxazoline]nickel dibromide, 2,2'-methylenebis[(4R)-4-isopropyl-5,5-di-n-propyloxazoline]nickel dibromide, methylenebis[(4R)-4-isopropyl-5,5-diisopropyloxazoline]nickel dlbromide, 2,2'-methylenebis[(4R)-4-isopropyl-5,5-dicyclohexyloxazoline]nickel dibromide, 2,2'-methylenebis[(4R)-4-isopropyl-5,5-diphenyloxazoline]nickel dibromide, 2,2'-methylenebis[(4R)-4-isopropyl-5,5-di-(2-methylphenyl)oxazoline]nickel dibromide, 2,2'-methylenebis[(4R)-4-isopropyl-5,5-di-(3-methylphenyl)oxazoline]nickel dibromide, 2,2'-methylenebis[(4R)-4-isopropyl-5,5-di-(4-methylphenyl)oxazoline]nickel dibromide, 2,2'-methylenebis[(4R)-4-isopropyl-5,5-di-(2-methoxyphenyl)oxazoline]nickel dibromide, 2,2'-methylenebis[(4R)-4-isopropyl-5,5-di-(3-methoxyphenyl)oxazoline]nickel dibromide, 2,2'-methylenebis[(4R)-4-isopropyl-5,5-di-(4-methoxyphenyl)oxazoline}]nickel dibromide, 2,2'-methylenebis[spiro{(4R)-4-isopropyloxazoline-5,1'-cyclobutane]nickel dibromide, 2,2'-methylenebis[spiro{(4R)-4-isopropyloxazoline-5,1'-cyclopentane}] nickel dibromide, 2,2'-methylenebis[spiro{(4R)-4-isopropyloxazoline-5,1'-cyclohexane}]nickel dibromide, 2,2'-methylenebis[spiro{(4R)-4-isopropyloxazoline-5,1'-cycloheptane}]nickel dibromide, 2,2'-methylenebis[(4R)-4-isobutyl-5,5-dimethyloxazoline]nickel dibromide, 2,2'-methylenebis[(4R)-4-isobutyl-5,5-diethyloxazoline]nickel dibromide, 2,2'-methylenebis[(4R)-4-isobutyl-5,5-di-n-propyloxazoline]nickel dibromide, 2,2'-methylenebis[(4R)-4-isobutyl-5,5-diisopropyloxazoline]nickel dibromide, 2,2'-methylenebis[(4R)-4-isobutyl-5,5-dicyclohexyloxazoline]nickel dibromide, 2,2'-methylenebis[(4R)-4-isobutyl-5,5-diphenyloxazoline]nickel dibromide, 2,2'-methylenebis[(4R)-4-isobutyl-5,5-di-(2-methylphenyl)oxazoline]nickel dibromide, 2,2'-methylenabis[(4R)-4-isobutyl-5,5-di-(3-methylphenyl)oxazoline]nickel dibromide, 2,2'-methylenebis[(4R)-4-isobutyl-5,5-di-(4-methylphenyl)oxazoline]nickel dibromide. 2,2'-methylenebis[(4R)-4-isobutyl-5,5-di-(2-methoxyphenyl)oxazoline]nickel dibromide, 2,2'-methylenebis[(4R)-4-isobutyl-5,5-di-(3-methoxyphenyl)oxazoline]nickel dibromide, 2,2'-methylenebis[(4R)-4-isobutyl-5,5-di-(4-methoxyphenyl)oxazoline]nickel dibromide, 2,2'-methylenebis[spiro{(4R)-4-isobutyloxazoline-5,1'-cyclobutane}]nickel dibromide, 2,2'-methylenebis[spiro{(4R)-4-isobutyloxazoline-5,1'-cyclopentane}]nickel dibromide, 2,2'-methylenebis[spiro{(4R)-4-isobutyloxazoline-5,1'-cyclohexane}]nickel dibromide, 2,2'-methylenebis[spiro{(4R)-4-isobutyloxazoline-5,1'-cycloheptane}]nickel dibromide, 2,2'-methylenebis[(4R)-4-tert-butyl-5,5-dimethyloxazoline]nickel dibromide, 2,2'-methylenebis[(4R)-4-tert-butyl-5,5-diethyloxazoline]nickel dibromide, 2,2'-methylenebis[(4R)-4-tert-butyl-5,5-di-n-propyloxazoline]nickel dibromide, 2,2'-methylenebis[(4R)-4-tert-butyl-5,5-diisopropyloxazoline]nickel dibromide, 2,2'-methylenebis[(4R)-4-tert-butyl-5,5-diphenyloxazoline]nickel dibromide, 2,2,1-methylenebis[(4R)-4-tert-butyl-5,5-dicyclohexyloxazoline] nickel dibromide, 2,2'-methylenebis[(4R)-4-tert-butyl-5,5-di-(2-methylphenyl)oxazoline]nickel dibromide, 2,2'-methylenebis[(4R)-4-tert-butyl-5,5-di-(3-methylphenyl) oxazoline]nickel dibromide, 2,2'-methylenebis[(4R)-4-tert-butyl-5,5-di-(4-methylphenyl)oxazoline]nickel dibromide, 2,2'-methylenebis[(4R)-4-tert-butyl-5,5-di-(2-methoxyphenyl)oxazoline]nickel dibromide, 2,2'-methylenebis[(4R)-4-tert-butyl-5,5-di-(3-methoxyphenyl)oxazoline]nickel dibromide, 2,2'-methylenebis[(4R)-4-tert-butyl-5,5-di-(4-methoxyphenyl)oxazoline]nickel dibromide, 2,2'-methylenebis[spiro{(4R)-4-tert-butyloxazoline-5,1'-cyclobutane}]nickel dibromide, 2,2'-methylenebis[spiro{(4R)-4-tert-butyloxazoline-5,1'-cyclopentane}]nickel dibromide, 2,2'-methylenebis[spiro{(4R)-4-tert-butyloxazoline-5,1'-cyclohexane}]nickel dibromide, 2,2'-methylenebis[spiro{(4R)-4-tert-butyloxazoline-5,1'-cycloheptane}] nickel dibromide, 2,2'-methylenebis[(4R)-4-phenyl-5,5-dimethyloxazoline]nickel dibromide, 2,2'-methylenebis[(4R)-4-phenyl-5,5-diethyloxazoline]nickel dibromide, 2,2'-methylenebis[(4R)-4-phenyl-5,5-di-n-propyloxazoline] nickel dibromide, 2,2'-methylenebis[(4R)-4-phenyl-5,5-diisopropyloxazoline]nickel dibromide, 2,2'-methylenebis[(4R)-4-phenyl-5,5-dicyclohexyloxazoline]nickel dibromide, 2,2'-methylenebis[(4R)-4-phenyl-5,5-diphenyloxazoline]nickel dibromide, 2,2'-methylenebis[(4R)-4-phenyl-5,5-di-(2-methylphenyl)oxazoline]nickel dibromide, 2,2'-methylen bis[(4R)-4-phenyl-5.5-di-(3-methylphenyl)oxazoline]nickel dibromide, 2,2'-methylenebis[(4R)-4-phenyl-5,5-di-(4-methylphenyl)oxazoline]nickel dibromide, 2,2'-methylenebis[(4R)-4-phenyl-5,5-di-(2-methoxyphenyl)oxazoline]nickel dibromide, 2,2'-methylenebis[(4R)-4-phenyl-5,5-di-(3-methoxyphenyl)oxazoline]nickel dibromide, 2,2'-methylenebis[(4R)-4-phenyl-5,5-di-(4-methoxyphenyl)oxazoline]nickel dibromide, methylenebis[spiro{(4R)-4-phenyloxazoline-5,1'-cyclobutane]nickel dibromide, 2,2'-methylenebis[spiro{(4R)-4-phenyloxazoline-5,1'-cyclopentane}]nickel dibromide, 2,2'-methylenebis[spiro{(4R)-4-phenyloxazoline-5,1'-cyclohexane}]nickel dibromide, 2,2'-methylenebis[spiro{(4R)-4-phenyloxazoline-5,1'-cycloheptane}]nickel dibromide, 2,2'-methylenebis[(4R)-4-benzyl-5,5-dimethyloxazoline]nickel dibromide, 2,2'-methylenebis[(4R)-4-benzyl-5,5-diethyloxazoline] nickel dibromide, 2,2'-methylenebis[(4R)-4-benzyl-5,5-di-n-propyloxazoline]nickel dibromide, 2,2'-methylenebis[(4R)-4-benzyl-5,5-diisopropyloxazoline]nickel dibromide, 2,2'-methylenebis[(4R)-4-benzyl-5,5-dicyclohexyloxazoline]nickel dibromide, 2,2'-methylenebis[(4R)-4-benzyl-5,5-diphenyloxazoline]nickel dibromide, 2,2'-methylenebis[(4R)-4-benzyl-5,5-di-(2-methylphenyl)oxazoline]nickel dibromide, 2,2'-methylenebis[(4R)-4-benzyl-5,5-di-(3-methylphenyl)oxazoline]nickel dibromide, 2,2'-methylenebis[(4R)-4-benzyl-5,5-di-(4-methylphenyl)oxazoline]nickel dibromide, 2,2'-methylenebis[(4R)-4-benzyl-5,5-di-(2-methoxyphenyl)oxazoline]nickel dibromide, 2,2'-methylenebis[(4R)-4-benzyl-5,5-di-(3-methoxyphenyl)oxazoline] nickel dibromide, 2,2'-methylenebis[(4R)-4-benzyl-5,5-di-(4-methoxyphenyl)oxazoline]nickel dibromide, 2,2'-methylenebis[spiro{(4R)-4-benzyloxazoline-5,1'-cyclobutane}]nickel dibromide, 2,2'-methylenebis[spiro{(4R)-4-benzyloxazoline-5,1'-cyclopentane}]nickel dibromide, 2,2'-methylenebis[spiro{(4R)-4-benzyloxazoline-5,1'-cyclohexane}]nickel dibromide, and 2,2'-methylenebis[spiro{(4R)-4-benzyloxazoline-5,1'-cycloheptane}] nickel dibromide; and antipodes and iastreomers of the above-mentioned compounds. Further examples thereof are [hydrotris(3,5-dimethylpyrazolyl)borate]nickel bromide,

[hydrotris (3,5-diethylpyrazolyl)borate]nickel bromide, and [hydrotris(3,5-di-tert-butylpyrazolyl)borate]nickel bromide.

Still further examples of the metal compound represented by the formula [5], wherein $M^2$ is a nickel atom, are compounds in which "dibromide" in the above-mentioned compounds is changed to "difluoride", "dichloride", "diiodide", "dimethyl", "diethyl", "diisopropyl", "diphenyl", "dibenzyl", "dimethoxide", "diethoxide", "di-n-propoxid", "diisopropoxide", "di-n-butoxide", "diisobutoxide", "di-tert-butoxide", "diphenoxide" or "di(2,6-di-tert-butylphenoxide)".

A further example of the metal compound represented by the formula [5], wherein $M^2$ is a nickel atom, is a compound represented by the following formula [8]:

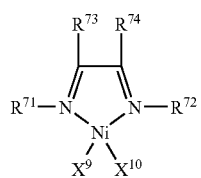

[8]

wherein each of $R^{71}$ and $R^{72}$ is a 2,6-diisopropylphenyl group; and $X^9$, $X^{10}$, $R^{73}$ and $R^{74}$ are any combination of the substituent groups shown in the folowing Table 1.

TABLE 1

| | | |
|---|---|---|
| $R^{73} = R^{74} = H$ | $R^{73} = R^{74} =$ methyl | Acenaphthyl by $R^{73}$ & $R^{74}$ |
| $X^9 = X^{10} = F$ | $X^9 = X^{10} = F$ | $X^9 = X^{10} = F$ |
| $R^{73} = R^{74} = H$ | $R^{73} = R^{74} =$ methyl | Acenaphthyl by $R^{73}$ & $R^{74}$ |
| $X^9 = X^{10} = Cl$ | $X^9 = X^{10} = Cl$ | $X^9 = X^{10} = Cl$ |
| $R^{73} = R^{74} = H$ | $R^{73} = R^{74} =$ methyl | Acenaphthyl by $R^{73}$ & $R^{74}$ |
| $X^9 = X^{10} = I$ | $X^9 = X^{10} = I$ | $X^9 = X^{10} = I$ |
| $R^{73} = R^{74} = H$ | $R^{73} = R^{74} =$ methyl | Acenaphthyl by $R^{73}$ & $R^{74}$ |
| $X^9 = X^{10} =$ Methyl | $X^9 = X^{10} =$ methyl | $X^9 = X^{10} =$ Methyl |
| $R^{73} = R^{74} = H$ | $R^{73} = R^{74} =$ methyl | Acenaphthyl by $R^{73}$ & $R^{74}$ |
| $X^9 = X^{10} =$ Ethyl | $X^9 = X^{10} =$ ethyl | $X^9 = X^{10} =$ ethyl |
| $R^{73} = R^{74} = H$ | $R^{73} = R^{74} =$ methyl | Acenaphthyl by $R^{73}$ & $R^{74}$ |
| $X^9 = X^{10} =$ n-propyl | $X^9 = X^{10} =$ n-propyl | $X^9 = X^{10} =$ n-propyl |
| $R^{73} = R^{74} = H$ | $R^{73} = R^{74} =$ methyl | Acenaphthyl by $R^{73}$ & $R^{74}$ |
| $X^9 = X^{10} =$ isopropyl | $X^9 = X^{10} =$ isopropyl | $X^9 = X^{10} =$ isopropyl |
| $R^{73} = R^{74} = H$ | $R^{73} = R^{74} =$ methyl | Acenaphthyl by $R^{73}$ & $R^{74}$ |
| $X^9 = X^{10} =$ n-butyl | $X^9 = X^{10} =$ n-butyl | $X^9 = X^{10} =$ n-butyl |
| $R^{73} = R^{74} = H$ | $R^{73} = R^{74} =$ methyl | Acenaphthyl by $R^{73}$ & $R^{74}$ |
| $X^9 = X^{10} =$ phenyl | $X^9 = X^{10} =$ phenyl | $X^9 = X^{10} =$ phenyl |
| $R^{73} = R^{74} = H$ | $R^{73} = R^{74} =$ methyl | Acenaphthyl by $R^{73}$ & $R^{74}$ |
| $X^9 = X^{10} =$ benzyl | $X^9 = X^{10} =$ benzyl | $X^9 = X^{10} =$ benzyl |

Further examples of the metal compound represented by the formula [5] are compounds in which a "nickel atom" in the above-mentioned nickel compounds is changed to a "palladium atom", a "cobalt atom", a "rhodium atom" or a "ruthenium atom".

Examples of the metal compound represented by the formula [5], wherein $M^2$ is an iron atom, are 2,6-bis-[1-(2,6-dimethylphenylimino)ethyl]pyridineiron dichloride, 2,6-bis-[1-(2,6-diisopropylphenylimino)ethyl]pyridineiron dichloride, 2,6-bis-[1-(2-tert-butylphenylimino)ethyl]pyridineiron dichloride, [hydrotris(3,5-dimethylpyrazolyl)borate]iron chloride, [hydrotris(3,5-diethylpyrazolyl)borate] iron chloride, and [hydrotris(3,5-di-tert-butylpyrazolyl) borate]iron chloride; and compounds in which "dichloride" in the above-mentioned iron compounds is changed to "dibromide", "difluoride", "diiodide", "dimethyl", "diethyl", "diisopropyl", "diphenyl", "dibenzyl", "dimethoxide", "diethoxide", "di-n-propoxide", "diisopropoxide", "di-n-butoxide", "diisobutoxide", "di-tert-butoxide", "diphenoxide" or "di(2,6-di-tert-butylphenoxide)".

Further examples of the metal compound represented by the formula [5] are compounds obtained by changing an "iron atom" in the above-mentioned iron compounds to a "cobalt atom" or a "nickel atom".

Examples of the µ-oxo type metal compound of the metal compound represented by the formula [5] are µ-oxobis[isopropylidene(cyclopentadienyl)(2-phenoxy)titanium chloride], µ-oxobis[isopropylidene(cyclopentadienyl)(2-phenoxy)titanium methoxide], µ-oxobis[isopropylidene(cyclopentadienyl)(3-tert-butyl-5-methyl-2-phenoxy)titanium chloride], µ-oxobis[isopropylidene(cyclopentadienyl)(3-tert-butyl-5-methyl-2-phenoxy)titanium methoxide], µ-oxobis[isopropylidene(methylcyclopentadienyl)(2-phenoxy)titanium chloride], µ-oxobis[isopropylidene(methylcyclopentadienyl)(2-phenoxy)titanium methoxide], µ-oxobis[isopropylidene(methylcyclopentadienyl)(3-tert-butyl-5-methyl-2-phenoxy)titanium chloride], µ-oxobis[isopropylidene(methylcyclopentadienyl)(3-tert-butyl-5-methyl-2-phenoxy)titanium methoxide], µ-oxobis[isopropylidene(tetramethylcyclopentadienyl)(2-phenoxy)titanium chloride], µ-oxobis[isopropylidene(tetramethylcyclopentadienyl)(2-phenoxy)titanium methoxide], µ-oxobis[isopropylidene(tetramethylcyclopentadienyl)(3-tert-butyl-5-methyl-2-phenoxy)titanium chloride], µ-oxobis[isopropylidene(tetramethylcyclopentadienyl)(3-tert-butyl-5-methyl-2-phenoxy)titanium methoxide], µ-oxobis[dimethylsilylene(cyclopentadienyl)(2-phenoxy)titanium chloride], µ-oxobis[dimethylsilylene(cyclopentadienyl)(2-phenoxy)titanium methoxide], µ-oxobis[dimethylsilylene(cyclopentadienyl)(3-tert-butyl-5-methyl-2-phenoxy)titanium chloride], µ-oxobis[dimethylsilylene(cyclopentadienyl)(3-tert-butyl-5-methyl-2-phenoxy)titanium methoxide], µ-oxobis[dimethylsilylene(methylcyclopentadienyl)(2-phenoxy)titanium chloride], µ-oxobis[dimethylsilylene(methylcyclopentadienyl)(2-phenoxy)titanium methoxide], µ-oxobis[dimethylsilylene(methylcyclopentadienyl)(3-tert-butyl-5-methyl-2-phenoxy)titanium chloride], µ-oxobis[dimethylsilylene(methylcyclopentadienyl)(3-tert-butyl-5-methyl-2-phenoxy)titanium methoxide], µ-oxobis[dimethylsilylene(tetramethylcyclopentadienyl)(2-phenoxy)titanium chloride], µ-oxobis[dimethylsilylene(tetramethylcyclopentadienyl)(2-phenoxy)titanium methoxide], µ-oxobis[dimethylsilylene(tetramethylcyclopentadienyl)(3-tert-butyl-5-methyl-2-phenoxy)titanium chloride], µ-oxobis[dimethylsilylene(tetramethylcyclopentadienyl)(3-tert-butyl-5-methyl-2-phenoxy)titanium methoxide], di-µ-oxobis[isopropylidene(cyclopentadienyl)(2-phenoxy)titanium], di-µ-oxobis[isopropylidene(cyclopentadienyl)(3-tert-butyl-5-methyl-2-phenoxy)titanium], di-µ-oxobis[isopropylidene(methylcyclopentadienyl)(2-phenoxy)titanium], di-µ-oxobis[isopropylidene(methylcyclopentadienyl)(3-tert-butyl-5-methyl-2-phenoxy)titanium], di-µ-oxobis[isopropylidene(tetramethylcyclopentadienyl)(2-phenoxy)titanium], di-µ-oxobis[isopropylidene(tetramethylcyclopentadienyl)(3-tert-butyl-5-methyl-2-phenoxy)titanium], di-µ-oxobis[dimethylsilylene(cyclopentadienyl)(2-phenoxy)titanium], di-µ-oxobis[dimethylsilylene(cyclopentadienyl)(3-tert-butyl-5-methyl-2-phenoxy)titanium], di-µ-oxobis[dimethylsilylene(methylcyclopentadienyl)(2-phenoxy)titanium], di-µ-oxobis[dimethylsilylene(methylcyclopentadienyl)(3-tert-butyl-5-methyl-2-phenoxy)titanium], di-µ-oxobis

[dimethylsilylene(tetramethylcyclopentadienyl)(2-phenoxy) titanium] and di-μ-oxobis[dimethylsilylene (tetramethylcyclopentadienyl)(3-tert-butyl-5-methyl-2-phenoxy)titanium].

Other examples of the compound (B), wherein the metal atom is a nickel atom, are nickel chloride, nickel bromide, nickel iodide, nickel sulfate, nickel nitrate, nickel perchlorate, nickel acetate, nickel trifluoroacetate, nickel cyanide, nickel oxalate, nickel acetylacetonate, bis(allyl)nickel, bis(1,5-cyclooctadiene)nickel, dichloro(1,5-cyloootadiene)nickel, dichlorobis(acetonitrile)nickel, dichlorobis(benzonitrile)nickel, carbonyl tris(triphenylphosphine)nickel, dichlorobis(triethylphosphine)nickel, di-acetobis(triphenylphosphine)nickel, tetrakis(triphenylphosphine)nickel, dichloro[1,2-bis(diphenylphosphino)ethane]nickel, bis[1,2-bis(diphenylphosphino)ethane]nickel, dichloro[1,3-bis(diphenylphosphino)propane]nickel, bis[1,3-bis(diphenylphosphino)propane]nickel, tetraamine nickel nitrate, tetrakis(acetonitrile)nickel tetrafluoroborate and nickel phthalocyanine.

Examples of the compound (B), wherein the metal atom is a vanadium atom, are vanadium acetylacetonate, vanadium tetrachloride and vanadium oxy trichloride. An example thereof, wherein the metal atom is a samarium atom, is bis(pentamethylcyclopentadienyl)samarium methyltetrahydrofuran. An example thereof, wherein the metal atom is an ytterbium atom, is bis(pentamethylcyclopentadienyl)ytterbium methyltetrahydrofuran.

The above-mentioned compounds as the compound (B) may be used singly, or may be used in combination of twe or more thereof. The compound (B) is preferably a metal compound (metallocen metal compound), wherein at least one $L^2$ in the formula [5] is a cyclopentadienyl type anion skeleton-containing group. Exampes of said metal compound are those respresented by the following formulas [9] to [11].

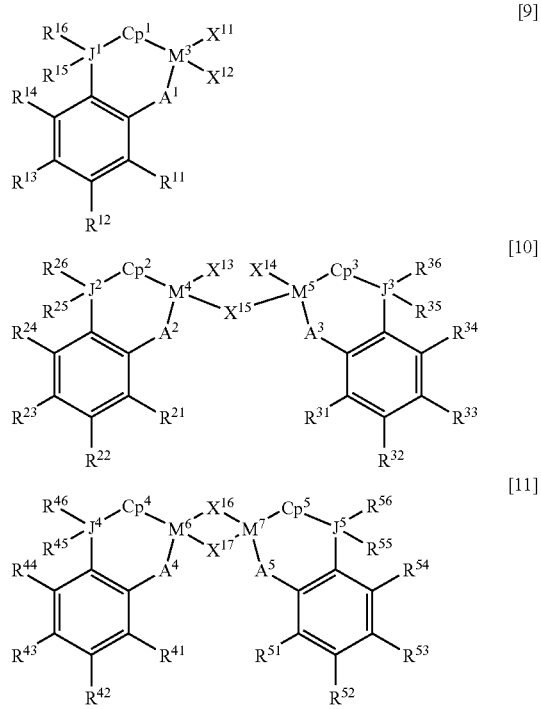

[9]

[10]

[11]

In these formulas, each of $M^3$ to $M^7$ is independently a metal atom of the Group 4 of the periodic table of the elements; each of $A^1$ to $A^5$ is independently an atom of the Group 16 of the periodic table of the elements; each of $J^1$ to $J^5$ is an atom of the Group 14 of the periodic table of the elements; each of $Cp^1$ to $Cp^5$ is a group having a cyclopentadienyl anion skeleton; $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ are independently a hydrogen atom, a halogen atom, a hydrocarbon group, a substituted silyl group, a hydrocarbon oxt group, a di-substituted amino group, a hydrocarbon thio group or a hydrocarbon seleno group, and $R^{11}$ to $R^{16}$, $R^{21}$ to $R^{26}$, $R^{31}$ to $R^{36}$, $R^{41}$ to $R^{46}$ and $R^{51}$ to $R^{56}$ may link to form a single ring or a plurarity of rings, which may be aromatic ring(s) or non-aromatic ring(s); and each of $X^{15}$ to $X^{17}$ is an atom of the Group 16 of the periodic table of the elements.

Examples of $M^3$ to $M^7$ in the formulas [9] to [11] are a titanium atom, a zirconium ato and a hafnium atom. Preferred is a titanium atom or a zirconium atom.

Examples of $Cp^1$ to $Cp^5$ in the formulas [9] to [11] are an $\eta^5$-(substituted)cyclopentadienyl group, an $\eta^5$-(substituted) indenyl group and an $\eta^5$-(substituted)fluorenyl group. Specific examples thereof are an $\eta^5$-cyclopentadienyl group, an $\eta^5$-methylcyclopentadienyl group, an $\eta^5$-dimethylcyclopentadienyl group, an $\eta^5$-trimethylcyclopentadienyl group, an $\eta^5$-tetramethylcyclopentadienyl group, an $\eta^5$-ethylcyclopentadienyl group, an $\eta^5$-n-propylcyclopentadienyl group, an $\eta^5$-isopropylcyclopentadienyl group, an $\eta^5$-n-butylcyclopentadienyl group, an $\eta^5$-sec-butylcyclopentadienyl group, an $\eta^5$-tert-butylcyclopentadienyl group, an $\eta^5$-phenylcyclopentadienyl group, an $\eta^5$-trimethysilylcyclopentadienyl group, an $\eta^5$-tert-butyldimethylsilylcyclopentadienyl group, an $\eta^5$-indenyl group, an $\eta^5$-methylindenyl group, an $\eta^5$-dimethylindenyl group, an $\eta^5$-n-propylindenyl group, an $\eta^5$-isopropylindenyl group, an $\eta^5$-n-butylindenyl group, an $\eta^5$-tert-butylindenyl group, an $\eta^5$-phenylindenyl group, an $\eta^5$-methylphenylindenyl group, an $\eta^5$-naphthylindenyl group, an $\eta^5$-trimethylsilylindenyl group, an $\eta^5$-tetrahydroindenyl group, an $\eta^5$-fluorenyl group, an $\eta^5$-methylfluorenyl group, an $\eta^5$-dimethylfluorenyl group, an $\eta^5$-tert-butylfluorenyl group, an $\eta^5$-di-tert-butylfluorenyl group, an $\eta^5$-phenylfluorenyl group, an $\eta^5$-diphenylfluorenyl group, an $\eta^5$-trimethysilylfluorenyl group and an $\eta^5$-bistrimethysilylfluorenyl group, preferably an $\eta^5$-cyclopentadienyl group, an $\eta^5$-methyloyclopentadienyl group, an $\eta^5$-n-butyl-cyclopentadienyl group, an $\eta^5$-tert-butylcyclopentadienyl group, an $\eta^5$-tetramethlcyclopentadienyl group, an $\eta^5$-indenyl group, an $\eta^5$-tetrahydroindenyl group and an $\eta^5$-fluorenyl group.

Examples of the halogen atom of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a fluorine atom, a chlorine atom, a bromine atom and an iodine atom, preferably a chlorine atom or a bromine atom, and more preferably a chlorine atom.

Examples of the hydrocarbon group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are an alkyl group, an aralkyl group and aryl group.

Examples of said alkyl group are a methyl group, an ethyl group, a n-propyl group, an isopropyl group, a n-butyl group, a sec-butyl group, a tert-butyl group, an isobutyl group, a n-pentyl group, a neopentyl group, a tert-pentyl group, a n-hexyl group, a n-octyl group, a n-decyl group, a n-dodecyl group, n-pentadecyl group and a n-eicosyl group.

These alkyl groups may b substituted with a halogen atom such as a fluorin atom, a chlorine atom, a bromine atom or an iodine atom. Examples of the alkyl group substituted with a halogen are a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, perchloropropyl group, a perchlorobutyl group and perbromopropyl group.

These halogenated alkyl groups may also be substituted with an alkoxy group such as a methoxy group and an ethoxy group; an aryloxy group such as a phenoxy group; or an aralkyloxy group such as a benzyloxy group.

The alkyl group in the formulas [9] to [11] is preferably an alkyl group having 1 to 20 carbon atoms, and more preferably a methyl group, an ethyl group, an isopropyl group, a tert-butyl group, an isobutyl group or a tert-pentyl group.

Examples of the aralkyl group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dlmethylphenyl)methyl group, a (2,6-dimethylphenyl)methyl group, a (3,4-dimethylphenyl)methyl group, a (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (tetradecylphenyl)methyl group, a naphthylmethyl group and an anthracenylmethyl group.

These aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The aralkyl group in the formulas [9] to [11] is preferably an aralkyl group having 7 to 20 carbon atoms, and more preferably a benzyl group.

Examples of the aryl group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group.

These aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The aryl group in the formulas [9] to [11] is preferably an aryl group having 6 to 20 carbon atoms, and more preferably a phenyl group.

The substituted silyl group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] means a silyl group substituted with a hydrocarbon group, and the hydrocarbon group may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as benzyloxy group. Said hydrocarbon group is preferably an alkyl group having 1 to 20 carbon atoms such as a methyl group, an ethyl group, a n-propyl group, an isopropyl group, a n-butyl group, a sec-butyl group, a tert-butyl group, an isobutyl group, a n-pentyl group, a n-hexyl group and a cyclohexyl group; or an aryl group such as a phenyl group.

Said substituted silyl group is preferably a mono-substituted silyl group having 1 to 20 carbon atoms such as a methylsilyl group, an ethylsilyl group and a phenylsilyl group; a di-substituted silyl group having 2 to 20 carbon atoms such as a dimethylsilyl group, a diethylsilyl group and a diphenylsilyl group; or a tri-substituted silyl group having 3 to 20 carbon atoms such as a trimethylsilyl group, a triethylsilyl group, a tri-n-propylsilyl group, a triisopropylsilyl group, a tri-n-butylsilyl group, a tri-sec-butylsilyl group, a tri-tert-butylsilyl group, a tri-isobutylsilyl group, a tert-butyldimethylsilyl group, a tri-n-pentylsilyl group, a tri-n-hexylsilyl group, a tricyclohexylsilyl group and a triphenylsilyl group, and further preferably a trimethylsilyl group, a tert-butyldimethylsilyl group or a triphenylsilyl group.

Examples of the hydrocarbonoxy group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are an alkoxy group, a aralkyloxy group and an aryloxy group.

Examples of the alkoxy group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicosoxy group.

These alkoxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The alkoxy group is preferably an alkoxy group having 1 to 20 carbon atoms, and more preferably a methoxy group, an ethoxy group, an isopropoxy group or a tert-butoxy group.

Examples of the aralkyloxy group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl) methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group and an anthracenylmethoxy group.

These aralkyloxy groups may be substituted with a halogen atom such as a fluorine atom, a chlorine atom, a bromine atom and an iodine atom; an alkoxy group such as a methoxy group and an ethoxy group, an aryloxy group such as a phenoxy group; or an aralkyloxy group such as a benzyloxy group.

The aralkyloxy group is preferably an aralkyloxy group having 7 to 20 carbon atoms, and more preferably a benzyloxy group.

Examples of the aryloxy group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group.

These aryloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The aryloxy group is preferably an aryloxy group having 6 to 20 carbon atoms.

The di-substituted amino group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] means an amino group substituted with two hydrocarbon groups or silyl groups, and the hydrocarbon group and the silyl group may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group. Examples of the hydrocarbon group are an alkyl group having 1 to 20 carbon atoms such as a methyl group, an ethyl group, a n-propyl group, an isopropyl group, a n-butyl group, a sec-butyl group, a tert-butyl group, an isobutyl group, a n-pentyl group, a n-hexyl group and a cyclohexyl group; an aryl group having 6 to 20 carbon atoms such as a phenyl group; an aralkyl group having 7 to 10 carbon atoms such as a benzyl group. Examples of the silyl group are a trimethylsilyl group and a tert-butyldimethylsilyl group. Examples of said di-substituted amino group are a dimethylamino group, a diethylamino group, a di-n-propylamino group, a diisopropylamino group, a di-n-butylamino group, a di-sec-butylamino group, a di-tert-butylamino group, a di-isobutylamino group, a tert-butylisopropylamino group, a di-n-hexylamino group, a di-n-octylamino group, a diphenylamino group, a bistrimethylsilylamino group and a bis-tert-butyldimethylsilylamino group, and preferred is a dimethylamino group, an diethylamino group, a diisopropylamino group, a di-tert-butylamino group or a bis-trimethylsilylamino group.

Examples of the hydrocarbon thio group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are an alkylthio group, an aralkylthio group and arylthio group.

Examples of the alkylthio group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a methylthio group, an ethylthio group, a n-propylthio group, an isopropylthio group, a n-butylthio group, a sec-butylthio group, a tert-butylthio group, a n-pentylthio group, a neopentylthio group, a n-hexylthio group, a n-octylthio group, a n-dodecylthio group, a n-pentadecylthio group and a n-eicosylthio group.

These alkylthio groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The alkylthio group is preferably an alkylthio group having 1 to 20 carbon atoms, and more preferably a methylthio group, an ethylthio group, an isopropylthio group or a tert-butylthio group.

Examples of the aralkylthio group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a benzylthio group, a (2-methylphenyl)methylthio group, a (3-methylphenyl)methylthio group, a (4-methylphenyl)methylthio group, a (2,3-dimethylphenyl)methylthio group, a (2,4-dimethylphenyl)methylthio group, a (2,5-dimethylphenyl)methylthio group, a (2,6-dimethylphenyl)methylthio group, a (3,4-dimethylphenyl)methylthio group, a (3,5-dimethylphenyl)methylthio group, a (2,3,4-timethylphenyl)methylthio group, a (2,3,5-timethylphenyl)methylthio group, a (2,3,6-timethylphenyl)methylthio group, a (2,4,5-timethylphenyl)methylthio group, a (2,4,6-timethylphenyl)methylthio group, a (3,4,5-timethylphenyl)methylthio group, a (2,3,4,5-tetramethylphenyl)methylthio group, a (2,3,4,6-tetramethylphenyl)methylthio group, a (2,3,5,6-tetramethylphenyl)methylthio group, a (pentamethylphenyl)methylthio group, an (ethylphenyl)methylthio group, a (n-propylphenyl)methylthio group, an (isopropylphenyl)methylthio group, a (n-butylphenyl)methylthio group, a (sec-butylphenyl)methylthio group, a (tert-butylphenyl)methylthio group, a (n-hexylphenyl)methylthio group, a (n-octylphenyl)methylthio group, a (n-decylphenyl) methylthio group, a naphthylmethylthio group and an anthracenylmethylthio group.

These aralkylthio groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The aralkylthio group is preferably an aralkylthio group having 7 to 20 carbon atoms, and more preferably a benzylthio group.

Examples of the arylthio group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a phenylthio group, a 2-methyphenylthio group, a 3-methylphenylthio group, a 4-methylphenylthio group, a 2,3-dimethylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 2-tert-butyl-3-methylphenylthio group, a 2-tert-butyl-4-methylphenylthio group, a 2-tert-butyl-5-methylphenylthio group, a 2-tert-butyl-6-methylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 2-tert-butyl-3,4-dimethylphenylthio group, a 2-tert-butyl-3,5-dimethylphenylthio group, a 2-tert-butyl-3,6-dimethylphenylthio group, a 2,6-di-tert-butyl-3-methylphenylthio group, a 2-tert-butyl-4,5-dimethylphenylthio group, a 2,6-di-tert-butyl-4-methylphenylthio group, a 3,4,5-trimethylphenylthio group, a 2,3,4,5-tetramethylphenylthio group, a 2,3,4,6-tetramethylphenylthio group, a 2-tert-butyl-3,4,6-trimethylphenylthio group, a 2,6-di-tert-butyl-3,4-dimethylphenylthio group, a 2,3,5,6-tetramethylphenylthio group, a 2-tert-butyl-3,5,6-trimethylphenylthio group, a 2,6-di-tert-butyl-3,5-dimethylphenylthio group, a pentamethylphenylthio group, an ethylphenylthio group, a n-propylphenylthio group, an isopropylphenylthio group, a n-butylphenylthio group, a sec-butylphenylthio group, a tert-butylphenylthio group, a n-pentylphenylthio group, a neopentylphenylthio group, a n-hexylphenylthio group, a n-octylphenylthio group, a n-decylphenylthio group, a n-tetradecylphenylthio group, a naphthylthio group and an anthracenylthio group.

These arylthio groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The arylthio group is preferably an arylthio group having 6 to 20 carbon atoms.

Examples of the hydrocarbon seleno group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formula [9] to [11] are an alkylseleno group, an aralkylseleno grouo and arylseleno group.

Examples of the alkylseleno group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a methylseleno group, an ethylseleno group, a n-propylseleno group, an isopropylseleno group, a n-butylseleno group, a sec-butylseleno group, a tert-butylseleno group, a n-pentylseleno group, a neopentylseleno group, a n-hexylseleno group, a n-octylseleno group, a n-dodecylseleno group, a n-pentadecylseleno group and a n-eicosylseleno group.

These alkylseleno groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The alkylseleno group is preferably an alkylseleno group having 1 to 20 carbon atoms, and more preferably a methylseleno group, an ethylseleno group, an isopropylseleno group or a tert-butylseleno group.

Examples of the aralkylseleno group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a benzylseleno group, a (2-methylphenyl)methylseleno group, a (3-methylphenyl)methylseleno group, a (4-methylphenyl)methylseleno group, a (2,3-dimethylphenyl)methylseleno group, a (2,4-dimethylphenyl)methylseleno group, a (2,5-dimethylphenyl)methylseleno group, a (2,6-dimethylphenyl)methylseleno group, a (3,4-dimethylphenyl)methylseleno group, a (3,5-dimethylphenyl)methylseleno group, a (2,3,4-timethylphenyl)methylseleno group, a (2,3,5-timethylphenyl)methylseleno group, a (2,3,6-timethylphenyl)methylseleno group, a (2,4,5-timethylphenyl)methylseleno group, a (2,4,6-timethylphenyl)methylseleno group, a (3,4,5-timethylphenyl)methylseleno group, a (2,3,4,5-tetramethylphenyl)methylseleno group, a (2,3,4,6-tetramethylphenyl)methylseleno group, a (2,3,5,6-tetramethylphenyl)methylseleno group, a (pentamethylphenyl)methylseleno group, an (ethylphenyl)methylseleno group, a (n-propylphenyl)methylseleno group, an (isopropylphenyl)methylseleno group, a (n-butylphenyl)methylseleno group, a (sec-butylphenyl)methylseleno group, a (tert-butylphenyl)methylseleno group, a (n-hexylphenyl)methylseleno group, a (n-octylphenyl)methylseleno group, a (n-decylphenyl)methylseleno group and a naphthylmethylseleno group.

These aralkylseleno groups may be substituted with a halogen atom such as a fluorine atom, a chlorine atom, a bromin atom and an iodine atom; an alkoxy group such as a methoxy group and an ethoxy group; an aryloxy group such as a phenoxy group; or an aralkyloxy group such as a benzyloxy group.

The aralkylseleno group is preferably an aralkylseleno group having 7 to 20 carbon atoms, and more preferably a benzylseleno group.

Examples of the arylseleno group of $X^{11}$ to $X^{14}$, $R^{11}$ to $R^{16}$, $R^{21}$ to $R^{26}$, $R^{31}$ to $R^{36}$, $R^{41}$ to $R^{46}$ and $R^{51}$ to $R^{56}$ in the formulas [9] to [11] are a phenylseleno group, a 2-methylphenylseleno group, a 3-methylphenylseleno group, a 4-methylphenylseleno group, a 2,3-dimethylphenylseleno group, a 2,4-dimethylphenylseleno group, a 2,5-dimethylphenylseleno group, a 2,6-dimethylphenylseleno group, a 3,4-dimethylphenylseleno group, a 3,5-dimethylphenylseleno group, a 2-tert-butyl-3-methylphenylseleno group, a 2-tert-butyl-4-methylphenylseleno group, a 2-tert-butyl-5-methylphenylseleno group, a 2-tert-butyl-6-methylphenylseleno group, a 2,3,4-trimethylphenylseleno group, a 2,3,5-trimethylphenylseleno group, a 2,3,6-trimethylphenylseleno group, a 2,4,5-trimethylphenylseleno group, a 2,4,6-trimethylphenylseleno group, a 2-tert-butyl-3,4-dimethylphenylseleno group, a 2-tert-butyl-3,5-dimethylphenylseleno group, a 2-tert-butyl-3,6-dimethylphenylseleno group, a 2,6-di-tert-butyl-3-methylphenylseleno group, a 2-tert-butyl-4,5-dimethylphenylseleno group, a 2,6-di-tert-butyl-4-methylphenylseleno group, a 3,4,5-trimethylphenylseleno group, a 2,3,4,5-tetramethylphenylseleno group, a 2,3,4,6-tetramethylphenylseleno group, a 2-tert-butyl-3,4,6-trimethylphenylseleno group, a 2,6-di-tert-butyl-3,4-dimethylphenylseleno group, a 2,3,5,6-tetramethylphenylseleno group, a 2-tert-butyl-3,5,6-trimethylphenylseleno group, a 2,6-di-tert-butyl-3,5-dimethylphenylseleno group, a pentamethylphenylseleno group, an ethylphenylseleno group, a n-propylphenylseleno group, an isopropylphenylseleno group, a n-butylphenylseleno group, a sec-butylphenylseleno group, a tert-butylphenylseleno group, a n-pentylphenylseleno group, a neopentylphenylseleno group, a n-hexylphenylseleno group, a n-octylphenylseleno group, a n-decylphenylseleno group, a is n-tetradecylphenylseleno group, a naphthylseleno group and an anthracenylseleno group.

These arylseleno groups maybe substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The arylseleno group is preferably an arylseleno group having 6 to 20 carbon atoms.

In the formulas [9] to [11], $X^{11}$ to $X^{14}$ are preferably independently a halogen atom, an alkyl group, an aralkyl group, an alkoxy group, an aryloxy group or a di-substituted amino group, and more preferably independently a halogen atom, an alkyl group, an alkoxy group or an aryloxy group.

In the formulas [9] to [11], $R^{11}$ to $R^{14}$, $R^{21}$ to $R^{24}$, $R^{31}$ to $R^{34}$, $R^{41}$ to $R^{44}$ and $R^{51}$ to $R^{54}$ are preferably independently a hydrogen atom, a halogen atom, an alkyl group, an aralkyl group, an aryl group, a substituted silyl group, an alkoxy group, an aralkyloxy group or an aryloxy group, and particularly, $R^{11}$, $R^{21}$, $R^{31}$, $R^{41}$ and $R^{51}$ are preferably independently an alkyl group, an aralkyl group, an aryl group or a substituted silyl group.

In the formulas [9] to [11], $R^{15}$, $R^{16}$, $R^{25}$, $R^{26}$, $R^{35}$ $R^{36}$, $R^{45}$, $R^{46}$, $R^{55}$ and $R^{56}$ are preferably independently a hydrogen atom, an alkyl group, an aralkyl group, an aryl group, a substituted silyl group, an alkoxy group, an aralkyloxy group or an aryloxy group.

Examples of $X^{15}$ to $X^{17}$ in the formulas [10] and [11] are an oxygen atom, a sulfur atom and a selenium atom, and preferred is an oxygen atom or a sulfur atom, and more preferred is an oxygen atom.

Examples of $A^1$ to $A^5$ in the formulas [9] to [11] are an oxygen atom, a sulfur atom and a selenium atom, and preferred is an oxygen atom.

Examples of $J^1$ to $J^5$ in the formulas [9] to [11] are a carbon atom, a silicon atom and a germanium atom, and preferred is a carbon atom or a silicon atom.

Examples of the metal compound represented by the formula [9] are methylene($\eta^5$-cyclopentadienyl)(3,5-dimethyl-2-phenoxy)titanium dichloride (herein-after, "$\eta^5$-" is sometimes omitted), methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyolopentadienyl)(3-phenyl-2-phenoxy) titanium dichloride, methylene(cyclopentadienyl)(3-tert-butyldimethylsilyl-5-methyl-2-phenoxy)titanium dichloride, methylene(cyclopentadienyl)(3-trimethyleilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyl dimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy) titanium dichloride, isopropylidene(cyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl -2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy) titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene (tetramethylcyclopentadienyl)(3-tert-butyl-2-phenoxy) titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy) titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2- phenoxy)titanium dichloride; and compounds in which ($\eta^5$-cyclopentadienyl) in the above-mentioned compounds is replaced with ($\eta^5$-methylcyclopentadienyl), ($\eta^5$-dimethylcyclopentadienyl), ($\eta^5$-trimethylcyclopentadienyl), ($\eta^5$-n-butylcyclopentadienyl), ($\eta^5$-tert-butylcyclopentadienyl), ($\eta^5$-trimethylsilylcyclopentadienyl), ($\eta^5$-tert-butyldimethylsilylcyclopentadienyl), ($\eta^5$-indenyl), ($\eta^5$-phenylindenyl) or ($\eta^5$-fluorenyl). Further, there can be exemplified compounds in which "dichloride" in the above-mentioned compounds is replaced with "dimethyl", "dibenzyl", "dimethoxide", "diphenoxide", "bis(dimethylamino)" or "bis(diethylamino)". Still further, there can be exemplified compounds in which "titanium" in the above-mentioned compounds is replaced with "zirconium" or "hafnium".

Moreover, examples of the metal compound represented by the formula [9] are dimethylsilylene($\eta^5$-cyclopentadienyl)(2-phenoxy)titanium dichloride, dimethylsilylene($\eta^5$-cyclopentadienyl)(3-methyl-2-phenoxy)titanium dichloride, dimethylsilylene($\eta^5$-cyclopentadienyl)(3,5-dimethyl-2-phenoxy)titanium dichloride, dimethylsilylene($\eta^5$-cyclopentadienyl)(3-tert-butyl-2-phenoxy)titanium dichloride, dimethylsilylene($\eta^5$-cyclopentadienyl)(3-tert-butyl-5-methyl-2-phenoxy)titanium dichloride, dimethylsilylene($\eta^5$-cyclopentadienyl)(3,5-di-tert-butyl-2-phenoxy)titanium dichloride, dimethylsilylene($\eta^5$-cyclopentadienyl)(5-methyl-3-phenyl-2-phenoxy)titanium dichloride, dimethylsilylene($\eta^5$-cyclopentadienyl)(3-tert-butyldimethylsilyl-5-methyl-2-phenoxy)titanium dichloride, dimethylsilylene($\eta^5$-cyclopentadienyl)(5-methyl-3-trimethylsilyl-2-phenoxy)titanium dichloride, dimethylsilylene($\eta^5$-cyclopentadienyl)(3-tert-butyl-5-methoxy-2-phenoxy)titanium dichloride, dimethylsilylene($\eta^5$-cyclopentadienyl)(3-tert-butyl-5-chloro-2-phenoxy)titanium dichloride, dimethylsilylene($\eta^5$-cyclopentadienyl)(3,5-diamyl-2-phenoxy)titanium dichloride, dimethylsilylene($\eta^5$-cyclopentadienyl)(1-naphtoxy-2-yl)titanium dichloride, dimethylsilylene($\eta^5$-tetramethylcyclopentadienyl)(2-phenoxy)titanium dichloride, dimethylsilylene($\eta^5$-tetramethylcyclopentadienyl)(3-methyl-2-phenoxy)titanium dichloride, dimethylsilylene($\eta^5$-tetramethylcyclopentadienyl)(3,5-dimethyl-2-phenoxy)titanium dichloride, dimethylsilylene($\eta^5$-tetramethylcyclopentadienyl)(3-tert-butyl-2-phenoxy)titanium dichloride, dimethylsilylene($\eta^5$-tetramethylcyclopentadienyl)(3-tert-butyl-5-methyl-2-phenoxy)titanium dichloride, dimethylsilylene($\eta^5$-tetramethylcyclopentadienyl)(3,5-di-tert-butyl-2-phenoxy)titanium dichloride, dimethylsilylene($\eta^5$-tetramethylcyclopentadienyl)(5-methyl-3-phenyl-2-phenoxy)titanium dichloride, dimethylsilylene($\eta^5$-tetramethylcyclopentadienyl)(3-tert-butyldimethylsilyl-5-methyl-2-phenoxy)titanium dichloride, dimethylsilylene($\eta^5$-tetramethylcyclopentadienyl)(5-methyl-3-trimethylsilyl-2-phenoxy)titanium dichloride, dimethylsilylene($\eta^5$-tetramethylcyclopentadienyl)(3-tert-butyl-5-methoxy-2-phenoxy)titanium dichloride, dimethylsilylene($\eta^5$-tetramethylcyclopentadienyl)(3-tert-butyl-5-chloro-2-phenoxy)titanium dichloride, dimethylsilylene($\eta^5$-tetramethylcyclopentadienyl)(3,5-diamyl-2-phenoxy)titanium dichloride, and dimethylsilylene($\eta^5$-tetramethylcyclopentadienyl)(1-naphtoxy-2-yl)titanium dichloride; and compounds in which ($\eta^5$-cyclopentadienyl) in the above-mentioned compounds is peplaced with ($\eta^5$-methylcyclopentadienyl), ($\eta^5$-dimethylcyclopentadienyl), ($\eta^5$-trimethylcyclopentadienyl), ($\eta^5$-n-butylcyclopentadienyl), ($\eta^5$-tert-butylcyclopentadienyl), ($\eta^5$-trimethylsilylcyclopentadienyl), ($\eta^5$-tert-butyldimethylsilylcyclopentadienyl), ($\eta^5$-indenyl), ($\eta^5$-phenylindenyl) or ($\eta^5$-fluorenyl). Further, there can be exemplified compounds in which "(2-phenoxy)" in the above-mentioned compounds is replaced with with "3-phenyl-2-phenoxy", "3-trimethylsilyl-2-phenoxy" or "3-tert-butyldimethylsilyl-2-phenoxy"; and compounds in which "dimethylsilylene" in the above-mentioned compounds is replaced with "diethysilylene", "diphenylsilylene" or "dimethoxysilylene". Still further, there can be exemplified compounds in which "dichloride" in the above-mentioned compounds is replaced with "dimethyl", "dibenzyl", "dimethoxide", "diphenoxide", "bis (dimethylamino)" or "bis(diethylamino)". Furthermore, there can be exemplified compounds in which "titanium" in the above-mentioned compounds is replaced with "zirconium" or "hafnium".

Moreover, examples of the metal compounds represented by the formula [10] are μ-oxobis{isopropylidene(cyclopentadienyl)(2-phenoxy)titanium chloride}, μ-oxobis(isopropylidene(cyclopentadienyl)(2-phenoxy)titanium methoxide), μ-oxbis{isopropylidene(cyclopentadienyl)(3-tert-butyl-5-methyl-2-phenoxy)titanium chloride}, μ-oxobis{isopropylidene(cyclopentadienyl)(3-tert-butyl-5-methyl-2-phenoxy)titanium methoxide}, μ-oxobis{isopropylidene(methylcyclopentadienyl)(2-phenoxy)titanium chloride}, μ-oxobis{isopropylidene(methylcyclopentadienyl)(2-phenoxy)titanium methoxide}, μ-oxobis{isopropylidene(methylcyclopentadienyl)(3-tert-butyl-5-methyl-2-phenoxy)titanium chloride}, μ-oxobis{isopropylidene(methylcyclopentadienyl)(3-tert-butyl-5-methyl-2-phenoxy)titanium methoxide}, μ-oxobis{isopropylidene(tetramethylcyclopentadienyl)(2-phenoxy)titanium chloride}, μ-oxobis{isopropylidene(tetramethylcyclopentadienyl)(2-phenoxy)titanium methoxide}, μ-oxobis{isopropylidene(tetramethylcyclopentadienyl)(3-tert-butyl-5-methyl-2-phenoxy)titanium chloride}, μ-oxobis{isopropylidene(tetramethylcyclopentadienyl)(3-tert-butyl-5-methyl-2-phenoxy)titanium methoxide}; and compounds in which ($\eta^5$-cyclopentadienyl) in the above-mentioned compouns is replaced with ($\eta^5$-dimethylcyclopentadienyl), ($\eta^5$-trimethylcyclopentadienyl), ($\eta^5$-n-butylcyclopentadienyl), ($\eta^5$-tert-butylcyclopentadienyl), ($\eta^5$-trimethylsilylcyclopentadienyl), ($\eta^5$-tert-butyldimethylsilylcyclopentadienyl), ($\eta^5$-indenyl), ($\eta^5$-methylindenyl) or ($\eta^5$-fluorenyl). Further, there can be exemplified compounds in which (2-phenoxy) in the above-mentioned compounds is replaced with with (3-methyl-2-phenoxy), (3,5-dimethyl-2-phenoxy), (3,5-di-tert-butyl-2-phenoxy), (3-phenyl-5-methyl-2-phenoxy) or (3-trimethylsilyl-5-methyl-2-phenoxy). Still further, there can be exemplified compounds in which "chloride" in the above-mentioned compounds is replaced with "methyl", "benzyl", "phenoxide", "dimethylamino" or "diethylamino". Furthermore, there can be exemplified compounds in which "titanium" in the above-mentioned compounds is replaced with "zirconium" or "hafnium".

Moreover, examples of the metal compounds represented by the formula [11] are di-μ-oxobis[isopropylidene(cyclopentadienyl)(2-phenoxy)titanium], di-μ-oxobis[isopropylidene(cyclopentadienyl)(3-tert-butyl-5-methyl-2-phenoxy)titanium], di-μ-oxobis[isopropylidene(methylcyclopentadienyl)(2-phenoxy)titanium], di-μ-oxobis[isopropylidene(methylcyclopentadienyl)(3-tert-butyl-5-methyl-2-phenoxy)titanium], di-μ-oxobis[isopropylidene(tetramethylcyclopentadienyl)(2-phenoxy)titanium], di-μ-oxobis[isopropylidene(tetramethylcyclopentadienyl)(3-tert-butyl-5-methyl-2-phenoxy)titanium], di-μ-oxobis[dimethylsilylene(cyclopentadienyl)(2-phenoxy)titanium], di-μ-oxobis[dimethylsilylene(cyclopentadienyl)(3-tert-butyl-5-methyl-2-phenoxy)titanium], di-μ-oxobis[dimethylsilylene(methylcyclopentadienyl)(2-phenoxy)titanium], di-μ-oxobis[dimethylsilylene(methylcyclopentadienyl)(3-tert-butyl-5-methyl-2-phenoxy)titanium], di-μ-oxobis [dimethylsilylene(tetramethylcyclopentadienyl)(2-phenoxy) titanium], di-μ-oxobis[dimethylsilylene (tetramethylcyclopentadienyl)(3-tert-butyl-5-methyl-2-phenoxy)titanium] and compounds in which ($\eta^5$-cyclopentadienyl) in the above-mentioned compouns is replaced with ($\eta^5$-dimethylcyclopentadienyl), ($\eta^5$-trimethylcyclopentadienyl), ($\eta^5$-n-butylcyclopentadienyl), ($\eta^5$-tert-butylcyclopentadienyl), ($\eta^5$-trimethylsilylcyclopentadienyl), ($\eta^5$-tert-butyldimethylsilylcyclopentadienyl), ($\eta^5$-indenyl), ($\eta^5$-methylindenyl) or ($\eta^5$-fluorenyl) Further, there can be exemplified compounds in which (2-phenoxy) in the above-mentioned compounds is replaced with with (3-methyl-2-phenoxy), (3,5-dimethyl-2-phenoxy), (3,5-di-tert-butyl-2-phenoxy), (3-phenyl-5-methyl-2-phenoxy) or (3-trimethylsilyl-5-methyl-2-phenoxy). Still further, there can be exemplified compounds in which "titanium" in the above-mentioned compounds is replaced with "zirconium" or "hafnium".

As the organoaluminum compound (C) used for the catlyst for addition polymerization according to the present invention, known organoaluminum compounds can be used. Preferred is an organoaluminum compound represented by the following formula [12]:

$$R^5{}_d AlY_{3-d} \qquad [12],$$

wherein d is a number satisfying $0 < d \leq 3$; $R^5$ is a hydrocarbon group, and when two or more $R^5$ groups exist, these may be the same or different; Y is a hydrogen atom, a halogen atom or an hydrocarbonoxy group, and when two or more Y's exist, they may be the same or different.

$R^5$ in the formula [12] is preferably a hydrocarbon group having 1 to 24 carbon atoms, and more preferably an alkyl group having 1 to 24 carbon atoms. Examples thereof are a methyl group, an ethyl group, a n-propyl group, a n-butyl group, an isobutyl group, a n-hexyl group, a 2-methylhexyl group and a n-octyl group. More preferred is an ethyl group, a n-butyl group, an isobutyl group or a n-hexyl group.

Examples of the halogen atom as Y in the formula [12] are a fluorine atom, a chlorine atom, a bromine atom and an iodine atom, and preferred is a chlorine atom.

The hydrocarbonoxy group as Y in the formula [12] is preferably an alkoxy group, an aralkyloxy group or an aryloxy group.

Examples of the alkoxy group as Y in the formula [12] are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-icosoxy group.

Each of those alkoxy groups may be substituted with a halogen atom such as a fluorine atom, a chlorine atom, a bromine atom and an iodine atom; an alkoxy group such as a methoxy group and an ethoxy group; or an aryloxy group such as a phenoxy group.

The alkoxy group as Y in the formula [12] is preferably an alkoxy group having 1 to 24 carbon atoms, and more preferably a methoxy group, an ethoxy group or a tert-butoxy group.

Examples of the aryloxy group as Y in the formula [12] are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthrathenoxy group.

Each of those aryloxy groups may be substituted with a halogen atom such as a fluorine atom, a chlorine atom, a bromine atom and an iodine atom; an alkoxy group such as a methoxy group and an ethoxy group; or an aryloxy group such as a phenoxy group.

The aryloxy group as Y in the formula [12] is preferably an aryloxy group having 6 to 24 carbon atoms.

Examples of the aralkyloxy group as Y in the formula [12] are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl) methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl) methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl) methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group and an anthrathenylmethoxy group.

Each of those aralkyloxy groups may be substituted with a halogen atom such as a fluorine atom, a chlorine atom, a bromine atom and an iodine atom; an alkoxy group such as a methoxy group and an ethoxy group; or an aryloxy group such as a phenoxy group.

The aralkyloxy group as Y in the formula [12] is preferably an aralkyloxy group having 7 to 24 carbon atoms, and more preferably a benzyloxy group.

Examples of the organoaluminum compound represented by the formula [12] are a trialkylaluminum such as trimethylaluminum, triethylaluminum, tri-n-propylaluminum, tri-n-butylaluminum, triisobutylaluminum, tri-n-hexylaluminum and tri-n-octylaluminum; a dialkylaluminum chloride such as dimethylaluminum chloride, diethylaluminum chloride, di-n-propylaluminum chloride, di-n-butylaluminum chloride, diisobutylaluminum chloride and di-n-hexylaluminum chloride; an alkylaluminum dichloride such as methylaluminum dichloride, ethylaluminum dichloride, n-propylaluminum dichloride, n-butylaluminum dichloride, isobutylaluminum dichloride and n-hexylaluminum dichloride; a dialkylaluminum hydride such as dimethylaluminum hydride, diethylaluminum hydride, di-n-propylaluminum hydride, di-n-butylaluminum hydride, diisobutylaluminum hydride and di-n-hexylaluminum hydride; an alkyl(dialkoxy)aluminum such as methyl(dimethoxy)aluminum, methyl(diethoxy)aluminum and methyl(di-tert-butoxy)aluminum; a dialkyl(alkoxy)aluminum such as dimethyl(methoxy)aluminum, dimethyl(ethoxy)aluminum and dimethyl(tert-butoxy)aluminum; an alkyl(diaryloxy)aluminum such as methyl(diphenoxy)aluminum, methylbis(2,6-diisopropylphenoxy)aluminum and methylbis(2,6-diphenylphenoxy) aluminum; and a dialkyl(aryloxy)aluminum such as dimethyl(phenoxy)aluminum, dimethyl(2,6-diisopropylphenoxy) aluminum and dimethyl(2,6-diphenylphenoxy)aluminum.

Among them, preferred is a trialkylaluminum, further preferred is trimethylaluminum, triethylaluminum, tri-n-butylaluminum, triisobutylaluminum or tri-n-hexylaluminum, and particularly preferred is triisobutylaluminum or tri-n-hexylaluminum.

These organoaluminum compounds may be used alone, or in combination of two or more thereof.

The ratio of the amount of the contact product (A) used to the amount of the compound (B) used is not particularly limited. The ratio of the molar amount of the metal atom ($M^1$) contained in the contact product (A) to the molar amount of the metal atom contained in the compound (B) is generally from 1 to 10000, preferably from 10 to 5000, further preferably from 100 to 3000, and particularly preferably from 500 to 2000. When using the compound (C), the ratio of the molar amount of the aluminum atom contained in the compound (C) to the metal atom contained in the compound (B) is generally from 1 to 10000, preferably from 10 to 5000, and further preferably from 100 to 1000.

As the catalyst for addition polymerization of the present invention, a contact product obtained by preliminarily contacting the contact product (A) and the compound (B), optionally, further the compound (C) may be used, and they may be also used by being separately charged in a polymerization vessel. The arbitrary two components among them may be also previously contacted, and further, another component may be also contacted.

Examples of the addition polymerizable monomer in the present invention are an olefin, a diolefin, a cyclic olefin, an alkenyl aromatic hydrocarbon and a polar monomer. A combination of two or more thereof may be used.

Examples thereof are an olefin such as ethylene, propylene, 1-butene, 1-pentene, 4-methyl-1-pentene-1, 5-methyl-1-hexene, 1-hexene, 1-heptene, 1-octene, 1-nonene, 1-decene and vinylcyclohexane, a diolefin such as 1,5-hexadiene. 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene and 1,3-cyclohexadiene; a cyclic olefin such as norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene and 8-cyanotetracyclododecene; an alkenyl aromatic hydrocarbon such as an alkenylbenzene (e.g. styrene, 2-phenylpropylene, 2-phenylbutene and 3-phenylpropylene), an alkylstyrene (e.g. p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene and p-sec-butylstyrene), a bis (alkenyl)benzene (e.g. divinylbenzene) and an alkenylnaphthalene (e.g. 1-vinylnaphthalene); and a polar monomer such as an $\alpha,\beta$-unsaturated carboxylic acid (e.g. acrylic acid, methacrylic acid, fumaric acid, maleic anhydride, itaconic acid, itaconic, anhydride and bicyclo(2,2,1)-5-heptene-2,3-dicarboxylic acid), and metal salts thereof(e.g. salts of sodium, potassium, lithium, zinc, magnesium and calcium), an $\alpha,\beta$-unsaturated carboxylic acid ester (e.g. methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate), an unsaturated dicarboxylic acid (e.g. maleic acid and itaconic acid), a vinyl ester (e.g. vinyl acetate, vinyl propionate, vinyl capronate, vinyl caprate, vinyl laurate, vinyl stearate and vinyl trifluoroacetate), and an unsaturated carboxylic acid glycidylate (e.g. acrylic acid glycidylate, methacrylic acid glycidylate and itaconic acid monoglycidylate).

The catalyst for addition polymerization of the present invention can be applied to homopolymerzation or copolymerzation of these monomers. Examples of a combination of monomers constituting the copolymer are ethylene and propylene; ethylene and 1-butene; ethylene and 1-hexene; and propylene and 1-butene.

The catalyst for olefin polymerization according to the present invention is particularly preferable as a catalyst for olefin polymerization, and is preferably used for a process for producing an olefin polymer. The olefin polymer is particularly preferably copolymers of ethylene with an $\alpha$-olefin. Among them, preferred is a copolymer of ethylene with an $\alpha$-olefin having a polyethylene crystal structure. The $\alpha$-olefin has preferably 3 to 8 carbon atoms, and examples thereof are propylene, 1-butene, 1-hexene and 1-octene.

A polymerization method is not particularly limited. For example, there can be exemplified a solvent polymerization method and a slurry polymerization method, in which an aliphatic hydrocarbon (e.g. butane, pentane, hexane, heptane and octane), an aromatic hydrocarbon (e.g. benzene and toluene) or a halogenated hydrocarbon (e.g. methylene dichloride) is used as a solvent; a bulk polymerization method, in which polymerization is carried out in a liquid monomer; a gas phase polymerization method, in which polymerization is carried out in a gaseous monomer; and a high-pressure polymerization method, in which polymerization is carried out in a supercritical liquid condition at a high temperature under a high pressure. As a polymerization type, either of a batch-wise type and a continuous type is possible. Further, polymerization may be carried out in two or more step shaving different polymerization conditions from each other.

A method of feeding the respective components in a reactor is not particularly limited. Examples thereof are a method of feeding them in a solid condition; and a method of feeding them in a condition of a solution, a suspension or a slurry, using a hydrocarbon solvent, from which components deactivating catalyst components such as moisture and oxygen are completely removed. Examples of the solvent are the above-mentioned aliphatic hydrocarbon (e.g. butane, pentane, hexane, heptane and octane), aromatic hydrocarbon (e.g. benzene and toluene) and halogenated hydrocarbon (e.g. methylene dichloride).

When using the contact product (A) and the compounds (B) and (C) in a soution, suspension or slurry, each of the contact product (A) and the compound (C) is used in a concentration of usually from 0.0001 to 100 mmol/liter, and preferably from 0.001 to 10 mmol/liter, in terms of the amount of metal atoms contained therein. A concentration of the component (B) is usually from 0.0001 to 100 mmol/liter, and preferably from 0.001 to 10 mmol/liter, in terms of the amount of a metal atom contained therein.

The polymerization temperature is usually from −100 to 350° C., preferably from −20 to 300° C., and more preferably from 20 to 300° C. The polymerization pressure is usually from 0.1 to 350 MPa, preferably from 0.1 to 300 MPa, and more preferably from 0.1 to 200 MPa. In general, the polymerization time can be appropriately determined according to the kind of a desired polymer and a reaction apparatus, and a range of from 1 minute to 20 hours can be adopted. In order to control a molecular weight of an addition polymer, a chain transfer agent such as hydrogen may be added.

EXAMPLES

The present invention is further illustrated in detail according to Examples and Comparative Examples below, but the present invention is not limited thereto.

The measurement values of respective items in Examples were measured according to methods described below.

(1) Content of α-olefin Unit in Polymer

The content of an α-olefin unit in an obtained polymer was determined from an IR absorption spectrum, wherein the measurement and calculation were carried out by using characteristic absorptions derived from the α-olefin, according to a method described in "Die Makromoleculare Chemie, 177, 449 (1976) McRae, M. A., Madams, W. F.". The result was shown as the number of a short chain branch per 1000 carbon atoms (short chain branch degree: SCB). The IR absorption spectrum was obtained by a measurement using an infrared spectrometer (FT-IR7300, manufactured by NIPPON BUNKO Inc.).

(2) Molecular Weight and Molecular Weight Distribution of Polymer

They were determined under the under-mentioned conditions according to a gel permeation chromatography (GPC). A calibration curve was prepared using standard polystyrenes. Molecular weight distribution was evaluated by a ratio, (Mw/Mn), of a weight average molecular weight (Mw) to a number average molecular weight (Mn):

equipment: 150C type, manufactured by Milipore Waters Co., Ltd.,
column: TSK-GEL GMH-HT, (7.5×600)×2 columns (manufactured by Tosoh Corporation),
measurement temperature: 140° C.,
solvent: o-dichlorobenzene,
measurement concentration: 5 mg/5 ml, and
detector: refractometer.

Example 1

(1) Preparation of Contact Product

Into a 100 ml four-necked flask purged with argon, 40 ml of toluene and 1 ml of a hexane solution of $ZnEt_2$ (concentration of $ZnEt_2$: 2.02 M) were added. Thereto, 0.292 ml of a toluene solution of pentafluorophenol (concentration of pentafluorophenol: 2.77 M) was added dropwise at room temperature. Thereafter, 29.1 μl (1.615 mmol) of water was added dropwise with a microsyringe at room temperature. After completion thereof, the mixture was stirred at 70° C. for one hour. The reaction mixture was a yellow slurry. Thereto, 116.3 mg (0.217 mmol) of methyldioctadecylamine and 10 ml of toluene were aded. The mixture was stirred at 70° C. for one hour, thereby obtaining a yellow slurry (hereinafter, referred to as "slurry ①"). A concentration of Zn contained in the slurry ① was calculated to be 40 μmol-Zn/ml, (2) Polymerization After drying under vacuum an autoclave reactor having an inner volume of 400 ml equipped with a stirrer, and replacing the atmosphere thereof with argon, 190 ml of hexane as a solvent and 10 ml of 1-hexene as a comonomer were charged, and the reactor was heated to 70° C. Then, ethylene was fed while adjusting at an ethylene pressure of 6 kg/cm². After the system was stabilized, 250 μmol of triisobutylaluminum was charged, successively, 0.05 μmol of ethylenebis(indenyl)ziconium dichloride was charged, and further 2.5 ml of the slurry ① (100 μmol-Zn) was added. Then, polymerization was carried out for 30 minutes. As a result, 9.79 g of an ethylene-1-hxene copolymer was obtained. The polymerization activity, SCB, Mw and Mw/Mn were 3.9× $10^8$ g/mol-Zr/hour, 15.42, 63000 and 2.0, respectively.

Example 2

(1) Preparation of Contact Product

Example 1 (1) was repeated except that the added amount of methyldioctadecylamine was changed to 224.6 mg (0.419 mmol). As a result, there was obtained a yellow slurry (hereinafter, referred to as "slurry ②"). A concentration of Zn contained in the slurry ② was calculated to be 40 μmol-Zn/ml.

(2) Polymerization

Example 1 (2) was repeated except that the slurry ① was changed to the slurry ②. As a result, 4.04 g of an ethylene-1-hxene copolymer was obtained. The polymerization activity, SCB, Mw and Mw/Mn were 1.8×$10^8$ g/mol-Zr/hour, 10.2, 71000 and 2.0, respectively.

Example 3

(1) Preparation of Contact Product

Example 1 (1) was repeated except that the added amount of water and the added amount of methyldioctadecylamine were changed to 32.8 μl (1.82 mmol) and 226.1 mg (0.422 mmol), respectively. There was obtained a yellow slurry (hereinafter, referred to as "slurry ③"). A concentration of Zn contained in the slurry ③ was calculated to be 40 μmol-Zn/ml.

(2) Polymerization

Example 1 (2) was repeated except that the slurry ① was changed to the slurry ③. As a result, 6.04 g of an ethylene-1-hxene copolymer was obtained. The polymerization activity was 2.4×$10^8$ g/mol-Zr/hour.

Example 4

(1) Polymerization

Example 3 (2) was repeated except that the charged amount of ethylenebis(indenyl)ziconium dichloride was changed to 0.2 μmol. As a result, 10.5 g of an ethylene-1- hxene copolymer was obtained. The polymerization activity and SCB were $1.0\times10^8$ g/mol-Zr/hour and 18.43, respectively.

Comparative Example 1

(1) Preparation of Zinc Compound

Example 1 (1) was repeated except that methyldioctadecylamine was not used. There was obtained a yellow slurry (hereinafter, referred to as "slurry ④"). A concentration of Zn contained in the slurry ④ was calculated to be 40 μmol-Zn/ml.

(2) Polymerization

Example 1 (2) was repeated except that the slurry ① was changed to the slurry ④. As a result, 1.49 g of an ethylene-1-hxene copolymer was obtained. The polymerization activity, SCB, Mw and Mw/Mn were $6.0\times10^7$ g/mol-Zr/hour, 11.12, 72000 and 2.2, respectively.

The invention claimed is:

1. A contact product obtained by a process comprising the step of contacting the following components (a) to (d):

(a) a compound represented by the following formula [1]

$$M^1L^1_r \qquad [1],$$

(b) a compound represented by the following formula [2]

$$R^1_{s-1}T^1H \qquad [2],$$

(c) a compound represented by the following formula [3], $$R^2_{t-2}T^2H_2 \qquad [3], \text{ and}$$

(d) a nonionic surfactant having no active hydrogen, wherein $M^1$ is a metal atom of the Groups 3 to 12, the Group 14, the Group 15 or Lanthanide Series of the Periodic Table of the Elements; r is a valence of $M^1$; $L^1$ is a hydrogen atom, a halogen atom, a hydrocarbon group or a hydrocarbonoxy group, and when two or more $L^1$'s exist, they may be the same or different from one another; each of $T^1$ and $T^2$ is a non-metal atom of the Group 15 or 16 in the Periodic Table independently of each other; s is a valence of $T^1$; t is a valence of $T^2$; $R^1$ is an electron-withdrawing group or an electron-withdrawing group-containing group, and when two or more $R^1$'s exist, they may be the same or different from one another; and $R^2$ is a hydrocarbon group, and when two or more $R^2$'s exist, they may be the same or different from one another.

2. The contact product according to claim 1, wherein the component (d) is a compound represented by the following formula [4], $$R^3_mZ \qquad [4],$$

wherein $R^3$ is a hydrocarbon group, and respective $R^3$'s may be the same or different from one another; Z is a nitrogen atom, an oxygen atom or a sulfur atom; and m is a valence of Z.

3. The contact product according to claim 2, wherein Z is a nitrogen atom, and at least one $R^3$ is a hydrocarbon group having from 12 to 100 carbon atoms.

4. The contact product according to claim 1, wherein each of $T^1$ and $T^2$ is a nitrogen atom or an oxygen atom independently of each other.

5. The contact product according to claim 1, wherein $R^1$ is a halogenated hydrocarbon group.

6. The contact product according to claim 1, wherein $M^1$ is a metal atom of the Groups 5 to 12, the Group 14 or the Group 15 of the Periodic Table of the Elements.

7. The contact product according to claim 1, wherein the component (b) is contacted in a molar amount of y per mol of the component (a) contacted, the component (c) is contacted in a molar amount of z per one mol of the component (a) contacted, and the component (d) is contacted in an amount of 0.01 to 0.7 mol per one mol of the component (a) contacted and y, z and r satisfy the following formula [I], r being the valence of $M^1$:

$$|r-y-2z|\leq 0.2 \qquad [I].$$

8. The contact product according to claim 1, wherein the process comprises the steps of:

(i) contacting the components (a) to (c) to obtain a contact product, and (ii) contacting said contact product with the component (d).

9. The contact product according to claim 1, wherein the process comprises the steps of:

(i) contacting the components (a), (b) and (d) to obtain a contact product, and (ii) contacting said contact product with the component (c).

10. A catalyst component for addition polymerization comprising a contact product according to claim 1.

11. A catalyst for addition polymerization obtained by a process comprising the step of contacting a catalyst component for addition polymerization according to claim 10 with a compound of a metal selected from the group consisting of metals of the Groups 3 to 12 and Lanthanide Series of the Periodic Table.

12. A catalyst for addition polymerization obtained by a process comprising the step of contacting a catalyst component for addition polymerization according to claim 10 with a compound of a metal selected from the group consisting of metals of the Groups 3 to 12 and Lanthanide Series of the Periodic Table, and an organoaluminum compound.

13. The catalyst for addition polymerization according to claim 11 or 12, wherein the compound of a metal selected from the group consisting of metals of the Groups 3 to 12 and Lanthanide Series of the Periodic Table is a metallocene compound.

14. A process for producing an addition polymer comprising the step of polymerizing an addition polymerizable monomer in the presence of a catalyst for addition polymerization according to claim 11 or 12.

* * * * *